United States Patent
Jeon et al.

(10) Patent No.: US 11,470,098 B2
(45) Date of Patent: Oct. 11, 2022

(54) TERMINAL DEVICE AND CONTROLLING METHOD THEREOF

(71) Applicant: SAMSUNG ELECTRONICS CO., LTD., Suwon-si (KR)

(72) Inventors: Intae Jeon, Suwon-si (KR); Jaewoo Seo, Suwon-si (KR); Seongwook Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 17/065,819

(22) Filed: Oct. 8, 2020

(65) Prior Publication Data

US 2021/0194898 A1 Jun. 24, 2021

(30) Foreign Application Priority Data

Dec. 23, 2019 (KR) ........................ 10-2019-0173415

(51) Int. Cl.
*H04L 29/06* (2006.01)
*H04L 9/40* (2022.01)
(Continued)

(52) U.S. Cl.
CPC ........ *H04L 63/1416* (2013.01); *H04L 63/145* (2013.01); *H04L 63/20* (2013.01); *H04W 12/128* (2021.01); *H04W 12/37* (2021.01)

(58) Field of Classification Search
CPC ... H04L 63/1416; H04L 63/145; H04L 63/20; H04W 12/128; H04W 12/37; G06F 21/55; G06F 40/20
See application file for complete search history.

(56) References Cited

U.S. PATENT DOCUMENTS 6,973,577 B1 * 12/2005 Kouznetsov .......... G06F 21/566
714/39
7,181,768 B1 2/2007 Ghosh et al.
(Continued)

FOREIGN PATENT DOCUMENTS

JP 2006-106939 4/2006
KR 10-2008-0079767 9/2008
(Continued)

OTHER PUBLICATIONS

Ham et al, "Android Mobile Application System Call Event Pattern Analysis for Determination of Malicious Attack", International Journal of Security and Its Applications, vol. 8 No. 1, pp. 231-246, 2014 (Year: 2014).*

(Continued)

*Primary Examiner* — John B King
(74) *Attorney, Agent, or Firm* — Nixon & Vanderhye, P.C.

(57) ABSTRACT

Disclosed is a terminal device. The terminal device includes: a communication interface comprising communication circuitry, a memory configured to store at least one command, and a processor, connected to the communication interface and the memory and configured to control the terminal device, the processor, by executing the at least one command, is further configured to: based on receiving, from an external server, sequence information of a plurality of attack words and a system call pattern associated with the sequence information, store the received sequence information and the received system call pattern in the memory, compare a system call command sequentially generated in the terminal device with the stored sequence information and the stored system call pattern, perform a security operation based on the comparison, and the sequence information of the plurality of attack words and the system call pattern associated with the sequence information may be generated by an (Continued)

external server, based on each of the plurality of attack words being identified from target information as occurring by a predetermined number or more.

20 Claims, 24 Drawing Sheets

(51) Int. Cl.
*H04W 12/37* (2021.01)
*H04W 12/128* (2021.01)

(56) References Cited

U.S. PATENT DOCUMENTS

| | | | |
|---|---|---|---|
| 8,640,240 B2 | 1/2014 | Sagoo et al. | |
| 10,491,621 B2 | 11/2019 | Ground et al. | |
| 2002/0035706 A1* | 3/2002 | Connor | G06F 11/1469 |
| | | | 714/E11.13 |
| 2003/0200464 A1* | 10/2003 | Kidron | H04L 63/0218 |
| | | | 709/224 |
| 2015/0033346 A1 | 1/2015 | Hebert et al. | |
| 2016/0140344 A1 | 5/2016 | Sato et al. | |

FOREIGN PATENT DOCUMENTS

| | | |
|---|---|---|
| KR | 10-0892415 | 4/2009 |
| KR | 10-2017-0087116 | 7/2017 |
| KR | 10-2017-0089324 | 8/2017 |
| KR | 10-2019-0041912 | 4/2019 |
| KR | 10-2019-0044435 | 4/2019 |

OTHER PUBLICATIONS

Lee et al., "A Conceptual Design of Knowledge-based Real-time Cyber-threat Early Warning System", Journal of Information and Security, Mar. 2006, 11 pages.
Ivanova et al., "Mirai Linux Backdoor Targets IoT Devices and Launches DDoS Attacks", https://bestsecuritysearch.com/mirai-linux-backdoor-attacks-iot-devices , Sep. 7, 2016, 5 pages.
Cimpanu, "Mirai DDoS Trojan Is the Next Big Threat to IoT Devices and Linux Servers", https://news.softpedia.com/news/mirai-ddos-trojan-is-the-next-big-threat-for-iot-devices-and-linux-servers-507964.html , Sep. 5, 2016, 4 pages.
International Search Report and Written Opinion dated Feb. 18, 2021in corresponding International Application No. PCT/KR2020/015804.
Gideon Creech et al., "A Semantic Approach to Host-Based Intrusion Detection Systems Using Contiguous and Discontiguous System Call Patterns", IEEE Transactions on Computers, vol. 63, Issue 4, Apr. 2014, pp. 807-817.

* cited by examiner

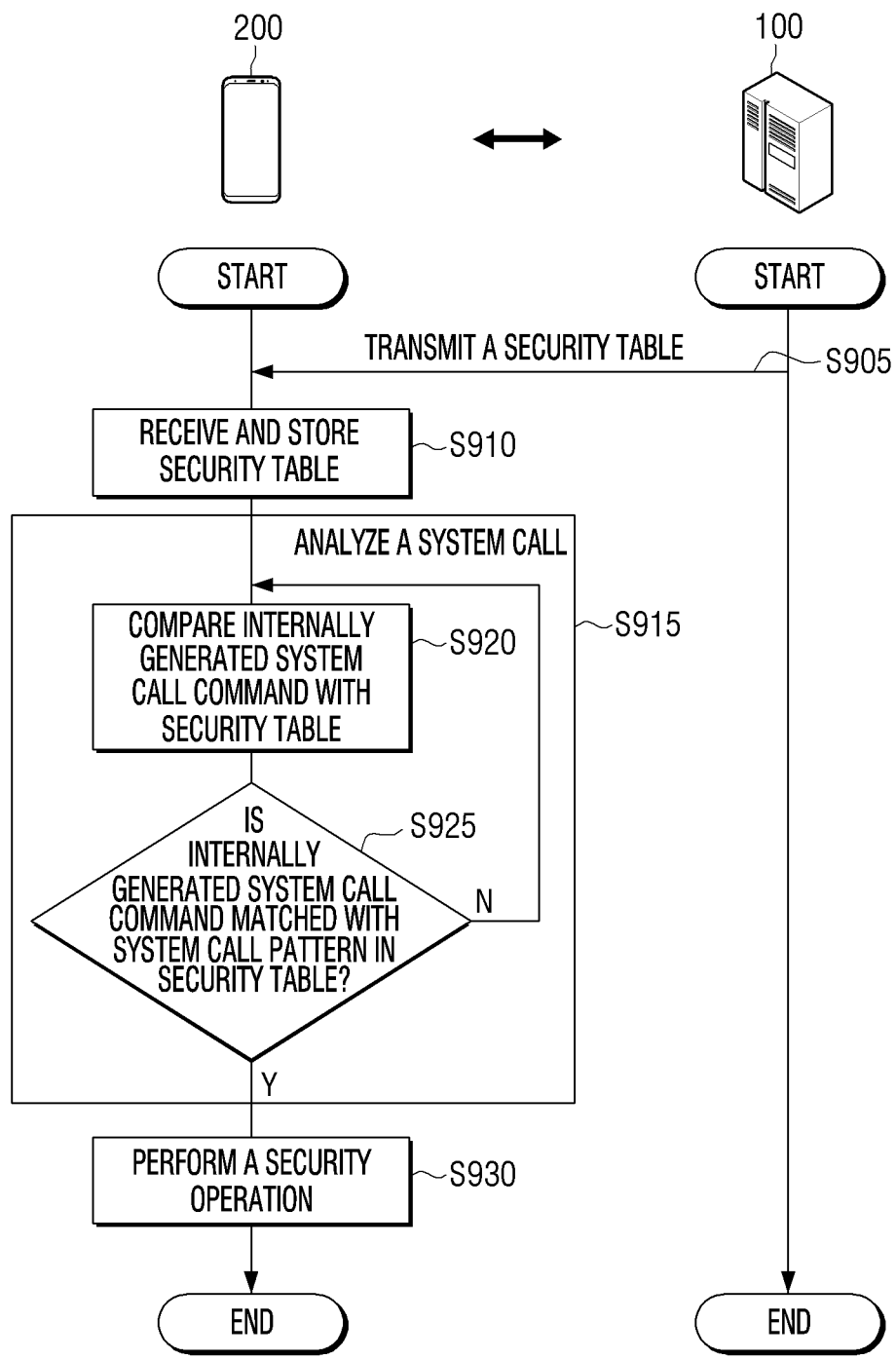

FIG. 10

| Attack Word | Synonym | Sub Word: weight | system call pattern |
|---|---|---|---|
| Brute Force | Brute forcing | launch: 0.7<br>attack: 0.2<br>execute: 0.1 | select->read->write->read->write->select->read->write->read->write->...(omission) |
| Flooding | Flood,<br>SYN Flooding | launch: 0.5<br>attack: 0.4<br>execute: 0.1 | Poll->sendto->recvmsg->write->poll->sendto->recvmsg->write->...(omission) |
| Foot Printing | Foot Printing<br>Scan, Scanning | being: 0.5<br>execute: 0.5 | connect->sendto->recvmsg->recvmsg->recvmsg->...(omission) |
| Privilege Escalation | Rooting, Elevate,<br>Elevating | exploit: 0.9<br>execute: 0.1 | Openat->getuid->getuid->read->getuid->geteuid->getpid->...(omission) |

1105 web page

The vulnerability that allows the attackers to insert malware in the IoT devices. Then Mirai launches brute-force attack on the Telnet port to infect the devices. The brute-force attack consists of an attacker submitting many passwords or passphrases. The brute-force attack is a cryptanalytic attack that can, in theory, be used to attempt to decrypt any encrypted data. Furthermore, it executes brute-force attacks to spread itself to other IoT devices.

The DDOS attack works by flooding a target with a massive amount of internet traffic, more than the target can handle. Finally, the Bashlite variant is "Ayedz", which is capable of delivering DDoS blows, run backdoor commands, can launch flood attacks against a wide range of router models. Flooding is used in computer networks routing algorithm. Flooding is used in bridging and in systems such as Usenet and peer-to-peer file sharing.

FIG. 12

| number | Attack Word | Synonym |
|---|---|---|
| 1 | Brute force | Brute forcing |
| 2 | Flooding | Flood, SYN Flooding |
| 3 | Foot Printing | Foot Printing Scan, Scanning |
| 4 | Privilege Escalation | Rooting, Elevate, Elevating |

| number | Attack Word | result |
|---|---|---|
| 1 | Brute force | 4 |
| 2 | Flooding | 4 |
| 3 | Foot Printing | 0 |
| 4 | Privilege Escalation | 0 |

1310

FIG. 14
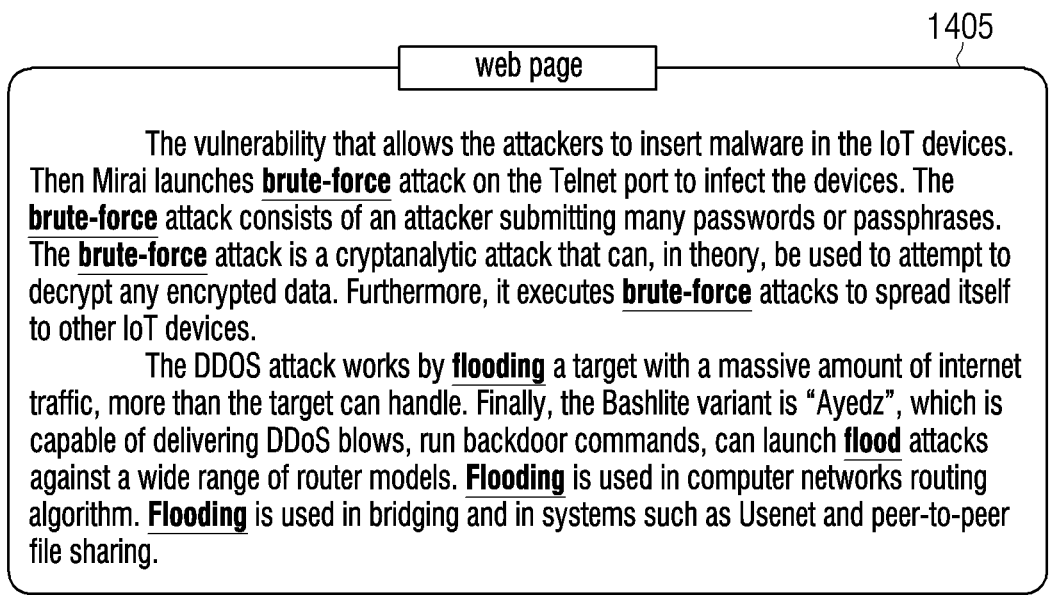
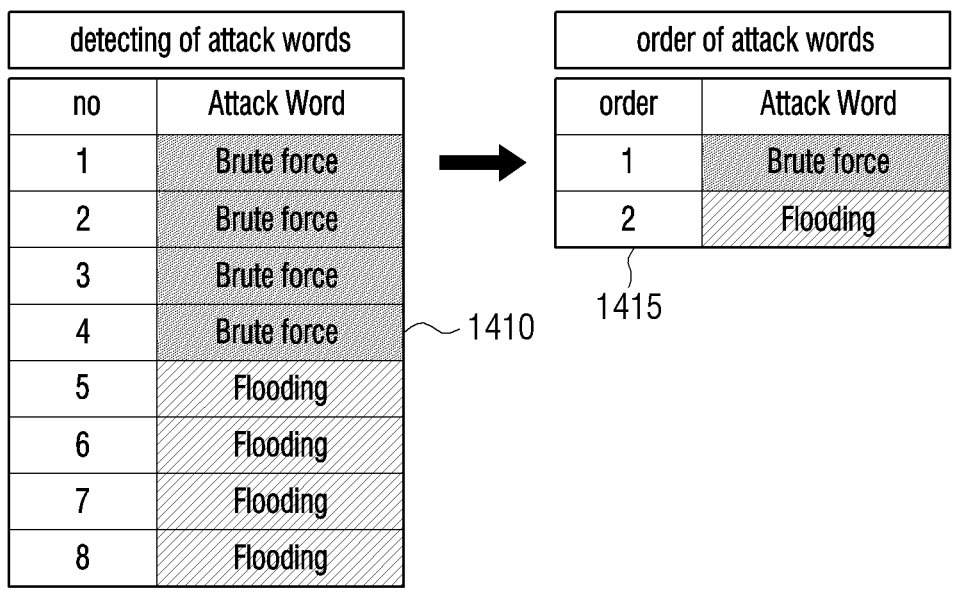

FIG. 15
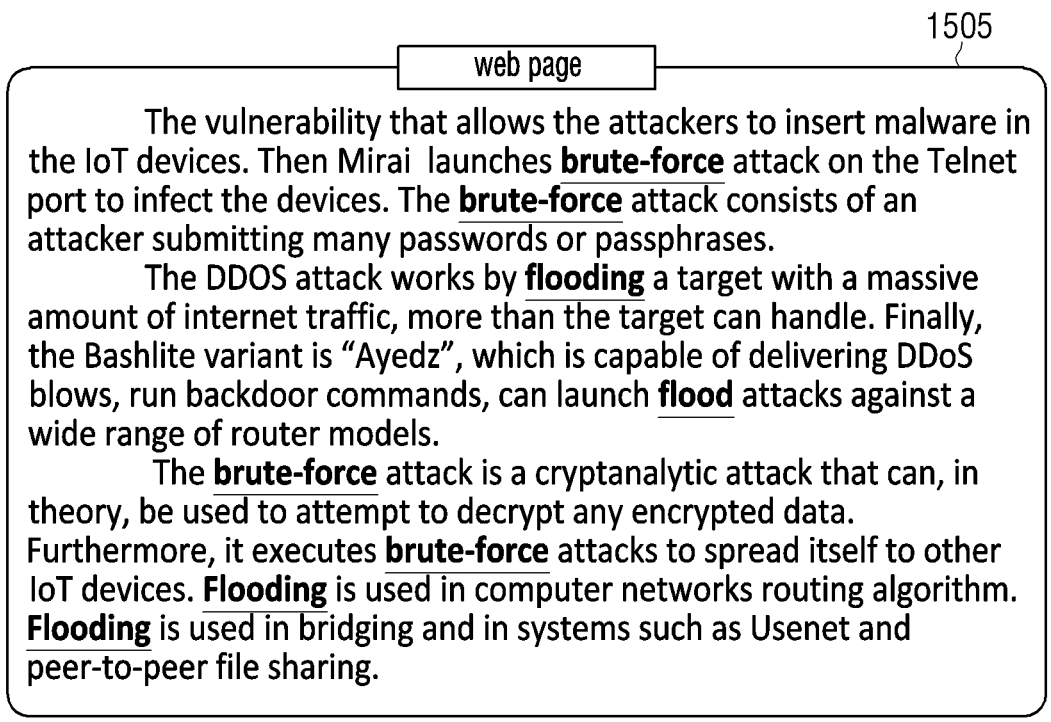
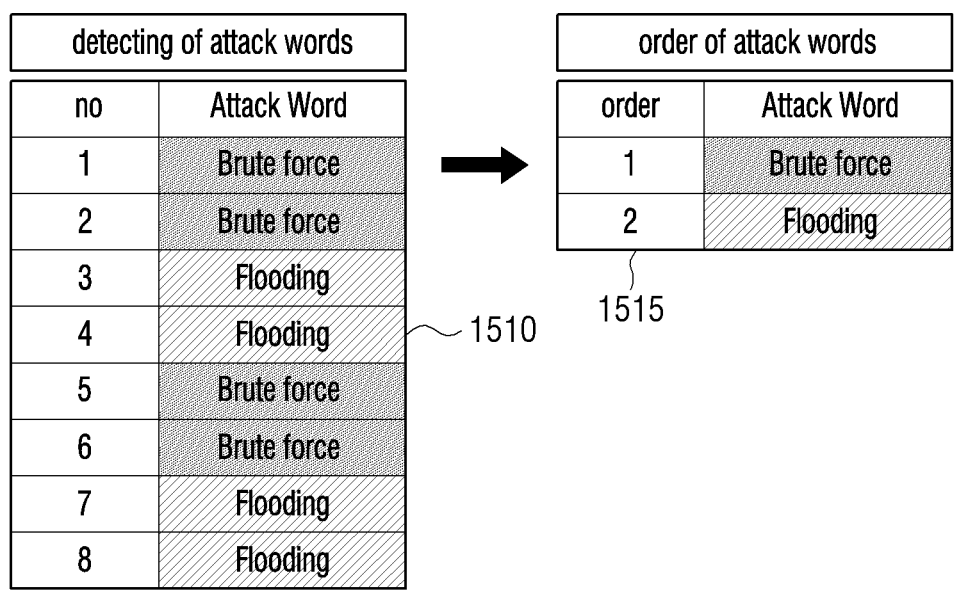

FIG. 16 web page — 1605

The vulnerability that allows the attackers to insert malware in the IoT devices. Then Mirai launches brute-force attack on the Telnet port to infect the devices. The brute-force attack consists of an attacker submitting many passwords or passphrases. The brute-force attack is a cryptanalytic attack that can, in theory, be used to attempt to decrypt any encrypted data. Furthermore, it executes brute-force attacks to spread itself to other IoT devices.

The DDOS attack works by flooding a target with a massive amount of internet traffic, more than the target can handle. Finally, the Bashlite variant is "Ayedz", which is capable of delivering DDoS blows, run backdoor commands, can launch flood attacks against a wide range of router models. Flooding is used in computer networks routing algorithm. Flooding is used in bridging and in systems such as Usenet and peer-to-peer file sharing.

— 1606, 1607

1610

| number | Attack Word | Sub Word: weight |
|---|---|---|
| 1 | Brute force | launch: 0.7<br>attack: 0.2<br>execute: 0.1 |
| 2 | Flooding | launch: 0.5<br>attack: 0.4<br>execute: 0.1 |

| sentence number | Attack Word | sub word | result |
|---|---|---|---|
| 1 | Brute force | launch | 0.7 |
| 2 | Brute force | consist | 0 |
| 3 | Brute force | is | 0 |
| 4 | Brute force | execute | 0.1 |
| 5 | Flooding | none | 0 |
| 6 | Flooding | launch | 0.5 |
| 7 | Flooding | is | 0 |
| 8 | Flooding | is | 0 |

| number | Attack Word | Important sentence | additional information |
|---|---|---|---|
| 1 | Brute force | Then Mirai launches brute-force attack on the Telnet port to infect the devices. | Telnet port |
| 2 | Flooding | Finally, the Bashlite variant is "Ayedz", which is capable of delivering DDoS blows, run backdoor commands, can launch flood attacks against a wide range of router models. | router models |

FIG. 18

| website | webpage | data | security webpage | title | content |
|---------|---------|------|------------------|-------|---------|
| A site | #A01 | 2019.09.01 | O | DDOS coming | a1,a2,a3 |
| A site | #A02 | 2019.09.02 | X | bank | b1,b1,b3 |
| B site | #B01 | 2019.09.01 | X | finance | c1,c2,c3 |
| B site | #B02 | 2019.09.02 | X | stock market | d1,d2,d3 |

| name (type) | number | Attack Word | system call pattern | additional information |
|---|---|---|---|---|
| Mirai (DDOS) | 1 | Brute force | select->read->write->read->write->select->read->write->read->write->...(omission) | Telnet port |
| | 2 | Flooding | poll->sendto->recvmsg->write->poll->sendto->recvmsg->write->...(omission) | router models |

FIG. 20

| name (type) | Attack word (order) | System call | | additional information |
|---|---|---|---|---|
| Mirai (DDOS) | Brute force(1) | 1 operating system | select→read→write→(omission) | Telnet port |
| | | 2 operating system | select→read→write→(omission) | |
| | | 3 operating system | select→read→write→(omission) | |
| | Flooding(2) | 1 operating system | poll→sendto→recvmsg→write→(omission) | router models |
| | | 2 operating system | poll→sendto→recvmsg→(omission) | |
| | | 3 operating system | sendto→(omission) | |

FIG. 21

| name (type) | Attack word (order) | System call | | additional information |
|---|---|---|---|---|
| Mirai (DDOS) | Brute force(1) | any operating system | select→read→write→ (omission) | Telnet port |
| | Flooding(2) | any operating system | sendto→ (omission) | router models |

| REPRESENTATIVE NAME | REPRESENTATIVE NUMBER | FIRST OPERATING SYSTEM | SECOND OPERATING SYSTEM | THIRD OPERATING SYSTEM |
|---|---|---|---|---|
| A | #0001 | a1 | a2 | a3 |
| B | #0002 | b1 | b2 | b3 |
| C | #0003 | c1 | c2 | c3 |
| D | #0004 | d1 | d2 | d3 |
| E | #0005 | e1 | e2 | e3 |
| F | #0006 | f1 | f2 | f3 |

2205

| name (type) | Attack word (order) | System call | RELATED INFORMATION |
|---|---|---|---|
| Mirai (DDOS) | 1 attack word | A-B-C | government office |
| | 2 attack word | D-E-F | |

2210

TERMINAL DEVICE AND CONTROLLING METHOD THEREOF

CROSS-REFERENCE TO RELATED APPLICATION

This application is based on and claims priority under 35 U.S.C. § 119 to Korean Patent Application Number 10-2019-0173415, filed on Dec. 23, 2019, in the Korean Intellectual Property Office, the disclosure of which is incorporated by reference herein in its entirety.

BACKGROUND

1. Field

The disclosure relates to an electronic apparatus and a controlling method thereof. For example, the disclosure relates to an electronic apparatus which collects security information from target information and stores same in a predetermined format, and a controlling method thereof.

2. Description of Related Art

A host-based intrusion detection system (HIDS) is one type of an intrusion detection system and monitors an operation or a status inside a system. The HIDS monitors the operation of the system or monitors the state of the system. The HIDS may monitor an abnormal call of a system call to detect an attack attempt (security threat) in real-time or detect an attack attempt based on system logs, system settings, and integrity of a file.

In an event of detecting an attack attempt based on a system call, the HIDS may compare the similarity between abnormally-detected system call and a pre-stored threat system call to identify an attack attempt.

The HIDS may identify similarity through a binary analysis, instead of a source code. The binary file analysis may refer, for example, to analyzing a software execution file itself through reverse engineering. The HIDS enables similarity and anomaly behavior detection according to the memory arrangement through binary analysis.

Malware is designed to bypass or avoid detecting by a security system, and thus, it is difficult to detect new malware. Therefore, in case of a new malware, a type thereof is difficult to be assumed and thus, it is highly likely that the malware is identified as security threat by the HIDS. The security system may be infected with a malicious code if the security threat is not detected, as it takes a significant time to analyze a new malware and a propagation rate or infection rate of the malware is fast.

In the case of the related-art HIDS, if malware data used for learning is not enough, a detection rate would be degraded, and it is difficult to detect new malware of a pattern that is not similar to malware data used for learning. Also, the related-art HIDS is difficult to detect new malware in a new pattern using a binary analysis.

SUMMARY

Embodiments of the disclosure provide an electronic apparatus storing information associated with a security attack by analyzing target information posted in an external server and a method for controlling thereof.

In accordance with an example embodiment of the disclosure, a terminal device includes: a communication interface comprising communication circuitry, a memory configured to store at least one command, and a processor, connected to the communication interface and the memory, configured to control the terminal device, and the processor, by executing the at least one command, is further configured to: based on receiving, from an external server, sequence information of a plurality of attack words and a system call pattern associated with the sequence information, store the received sequence information and the received system call pattern in the memory, compare a system call command sequentially generated in the terminal device with the stored sequence information and the stored system call pattern, perform a security operation based on a comparison result, and the sequence information of the plurality of attack words and the system call pattern associated with the sequence information may be generated by an external server, based on each of the plurality of attack words being identified from target information by a predetermined number or more.

An electronic apparatus according to an example embodiment includes: a communication interface comprising communication circuitry, a memory configured to store at least one command, and a processor, connected to the communication interface and the memory, configured to control the terminal device, the memory is further configured to store a plurality of attack words and a system call pattern corresponding to each of the plurality of attack words, and the processor, by executing the at least one command, is further configured to: based on each of the plurality of attack words stored in the memory by a predetermined number or more being identified from target information, obtain sequence information of the plurality of attack words based on the target information, obtain a system call pattern corresponding to the sequence information based on information stored in the memory, and control the communication interface to transmit, to an external terminal device, the obtained sequence information and the system call pattern.

A method of controlling a terminal device according to an example embodiment includes, by executing the at least one command: receiving, from an external server, sequence information of a plurality of attack words and a system call pattern associated with the sequence information and storing the received sequence information of the plurality of attack words and the received system call pattern associated with the sequence information, comparing a system call command sequentially generated in the terminal device with the stored sequence information and the stored system call pattern; and performing a security operation based on a comparison result, and the sequence information of the plurality of attack words and the system call pattern associated with the sequence information may be generated by an external server, based on each of the plurality of attack words being identified from target information by a predetermined number or more.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 9 is a signal flow diagram illustrating an example operation of a system call analysis of FIG. 7 according to an embodiment;

FIG. 10 is a table illustrating example attack word information according to an embodiment;

FIG. 11 is a diagram illustrating an example analyzing operation based on whether a predetermined attack word is included in target information in a target information monitoring operation according to an embodiment;

FIG. 12 is a table illustrating example synonyms of attack words, according to an embodiment;

FIG. 13 is a table illustrating an example number of an attack word according to an embodiment;

FIG. 14 is a diagram illustrating an example of analyzing a predetermined attack word in the target information in a target information monitoring operation according to an embodiment;

FIG. 15 is a diagram illustrating an example of analyzing a predetermined order of an attack word in a target information monitoring operation according to an embodiment;

FIG. 16 is a diagram illustrating an example operation of identifying a main sentence in a target information monitoring operation according to an embodiment;

FIG. 17 is a table illustrating an example operation of obtaining security attack-related information in a target information monitoring operation according to an embodiment;

FIG. 18 is a table illustrating an example operation of identifying overlapping target information in a target information monitoring operation according to an embodiment;

FIG. 19 is a table illustrating an example operation of generating and storing a security table according to an embodiment;

FIG. 20 is a table illustrating an example format in an example operation of generating and storing a security table according to an embodiment;

FIG. 21 is a table illustrating an example format in an example operation of generating and storing a security table according to an embodiment;

FIG. 22 are tables illustrating an example format in an example operation of generating and storing a security table according to a still another embodiment;

DETAILED DESCRIPTION

Figure 1:
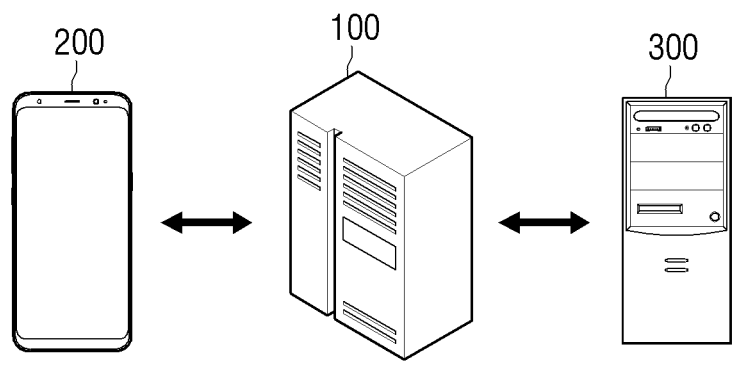
FIG. 1 is a diagram illustrating an example security system according to an embodiment.

The disclosure will be described in greater detail with reference to the attached drawings.

The terms used in the present disclosure and the claims are general terms identified in consideration of the functions of the various example embodiments of the disclosure. However, these terms may vary depending on intention, legal or technical interpretation, emergence of new technologies, and the like of those skilled in the related art. Some terms arbitrarily selected. Unless there is a specific definition of a term, the term may be understood based on the overall contents and technological common sense of those skilled in the related art.

Expressions such as "have," "may have," "include," "may include" or the like represent presence of a corresponding feature (for example, components such as numbers, functions, operations, or parts) and do not exclude the presence of additional features.

Expressions such as "at least one of A or B" and "at least one of A and B" should be understood to represent "A," "B" or "A and B."

As used herein, the terms "first," "second," or the like may identify corresponding components, regardless of importance and/or order, and may be used to distinguish a component from another without limiting the components.

In addition, a description that one element (e.g., a first element) is "(operatively or communicatively) coupled with/to" or "connected to" another element (e.g., a second element) should be interpreted to include both the case that the one element is directly coupled to the other element, and the case that the one element is coupled to the another element through still another element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," "part," and so on may be used to refer to an element that performs at least one function or operation, and such element may be implemented as hardware or software, or a combination of hardware and software. Further, other than when each of a plurality of "modules," "units," "parts," and the like must be realized in an individual hardware, the components may be integrated in at least one module or chip and be realized in at least one processor (not shown).

In the following description, a term user may refer to a person using an electronic apparatus or a device (for example, an artificial intelligence electronic apparatus) using an electronic apparatus.

Hereinafter, various example embodiments will be described in greater detail with reference to the accompanying drawings.

A function related to artificial intelligence may be operable through a processor and a memory. A processor may include, for example, one or a plurality of processors. One or a plurality of processors may include a general-use processor such as, for example, and without limitation, a central processing unit (CPU), a dedicated processor, an application processor (AP), a digital signal processor (DSP), or the like, a graphics-only processor such as a graphics processing unit (GPU) and a vision processing unit (VPU), or an AI-only processor such as a neural network processing unit (NPU), or the like. One or a plurality of processors may control processing of the input data according to a predefined operating rule or AI model stored in the memory. Where the one or a plurality of processors are an AI-only processor, the AI-only processor may be designed with a hardware structure specialized for the processing of a particular AI model.

A predefined operating rule or AI model may be made through learning. Being made through learning may refer, for example, to a predetermined operating rule or AI model set to perform a desired feature (or purpose) made by making a basic AI model trained using various training data using learning algorithm. The learning may be accomplished through a separate server and/or system, but is not limited thereto and may be implemented in an electronic apparatus. Examples of learning algorithms include, but are not limited to, supervised learning, unsupervised learning, semi-supervised learning, or reinforcement learning.

The AI model may include a plurality of neural network layers. Each of the plurality of neural network layers may include a plurality of weight values, and may perform a neural network processing operation through an iterative operation leveraging results of a previous layer and a plurality of weight values. The weight values included in the plurality of neural network layers may be optimized by learning results of the AI model. For example, the weight values may be updated such that a loss value or a cost value obtained by the AI model is reduced or minimized during the learning process. The artificial neural network may include deep neural network (DNN) and may include, for example, but is not limited to, convolutional neural network (CNN), recurrent neural network (RNN), restricted Boltzmann machine (RBM), deep belief network (DBN), bidirectional recurrent deep neural network (BRDNN), deep Q-networks, or the like.

FIG. 1 is a diagram illustrating an example security system according to an embodiment.

The security system may include an electronic apparatus 100, a terminal device 200, and a server 300.

The electronic apparatus 100 may refer, for example, to an apparatus for receiving target information from the server 300 and storing the security information in a predetermined format. The electronic apparatus 100 can provide security information in a predetermined format to the terminal device 200. According to an embodiment, the electronic apparatus 100 can be implemented as a server. However, the embodiment is not limited to a server and can be implemented with various devices, in addition to a server.

The target information may refer, for example, to an object for identifying whether information related to a security threat is included. For example, the target information may include, without limitation, at least one of a web page, a file, a document, and other content including information related to a security attack. The target information can be information stored in the server 300, and the electronic apparatus 100 can request the target information to the server 300 in a manner predetermined in the server 300. The predetermined manner will be described in greater detail below with reference to FIGS. 2 and 18.

The electronic apparatus 100 may analyze target information and obtain security information. The security information may refer, for example, to information related to a security attack obtained from the target information. The security information may include various kinds of information that threatens security. For example, the security information may include, without limitation, at least one of an attack name, an order of an attack word (sequence information), a system call pattern corresponding to the attack word (or a system call pattern corresponding to sequence information), a main sentence, and a security attack related information. A more detailed description will be provided below with reference to FIGS. 2 and 12.

The electronic apparatus 100 may store the obtained security information in a predetermined format. An operation of storing security information in a predetermined format may refer, for example, to an operation of generating a security table. The electronic apparatus 100 may transmit information corresponding to the generated security table to the terminal device 200.

The terminal device 200 may receive and store information corresponding to the security table from the electronic apparatus 100. The terminal device 200 may analyze the system call based on the stored security table. The terminal device 200 may detect a security attack (or a security threat, an attack name) by analyzing a system call pattern inside the terminal device 200 generated, for example, in real time.

The system call may correspond to a minimum unit of system commands A system command of a minimum unit may refer, for example, to a system call not decomposed into a plurality of commands on a source code. The system call may refer, for example, to an interface for accessing a kernel based on a request of an application program for a service provided by the kernel of the operating system. For example, the system call may include, without limitation, commands such as select, read, write, poll, and sendto, etc.

The terminal device 200 may include at least one of, for example, and without limitation, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, a wearable device, or the like. The wearable device may include, for example, and without limitation, at least one of an accessory type (e.g., a watch, a ring, a bracelet, an ankle bracelet, a necklace, a pair of glasses, a contact lens or a head-mounted-device (HMD)), a fabric or a garment-embedded type (e.g., electronic cloth), skin-attached type (e.g., a skin pad or a tattoo), a bio-implantable circuit, or the like. In some embodiments, the terminal device 200 may include at least one of, for example, and without limitation, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, an electronic frame, or the like.

In other embodiments, the terminal device 200 may include, for example, and without limitation, at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale (POS) of a store, an Internet of Things (IoT) device (e.g., light bulbs, sensors, sprinkler devices, fire alarms, thermostats, street lights, toasters, exercise equipment, hot water tanks, heater, boiler, etc.), or the like.

The server 300 may refer, for example, to a server for storing target information. The server 300 may include, for example, at least one of a data server or a web server. For example, the server 300 may refer, for example, to a web server and may include a device for transmitting a web page to a client device. The web page may include a document made of a web language (e.g., hypertext mark-up language (HTML)) or an object (image or audio file). The server 300 may receive a request for web page information from the client device and transmit the web page information to the client device based on the received request.

Figure 2:
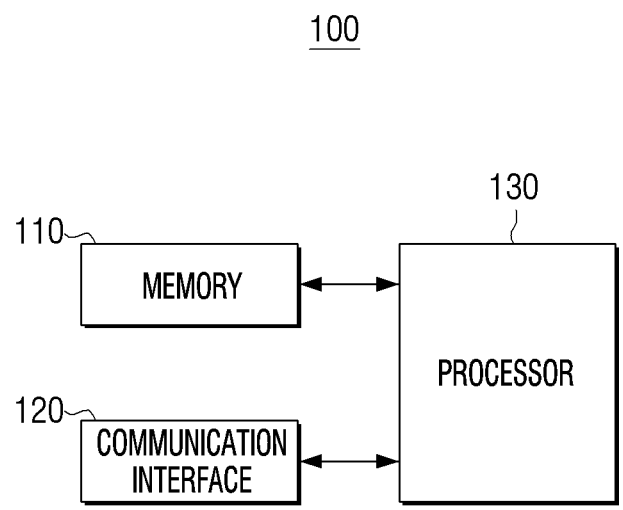
FIG. 2 is a block diagram illustrating an example electronic apparatus according to an embodiment.

FIG. 2 is a block diagram illustrating an example electronic apparatus according to an embodiment.

Referring to FIG. 2, the electronic apparatus 100 may include a memory 110, a communication interface (e.g., including communication circuitry) 120, and a processor (e.g., including processing circuitry) 130.

The memory 110 may be implemented as an internal memory such as a read-only memory (ROM) (for example, electrically erasable programmable read-only memory (EEPROM)) and a random-access memory (RAM) included in the processor 130 or a memory separate from the processor 130. In this case, the memory 110 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100.

A memory embedded in the electronic apparatus 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

The memory 110 may store at least one command. The processor 130 may perform various operations based on a command stored in the memory 110.

The memory 110 may store various information related to security attack. The memory 110 may store information associated with the attack word.

The attack word may refer, for example, to an attack skill associated with the security attack or a word associated with the security attack.

An attack word according to an example embodiment may refer, for example, to a particular word (e.g., "Brute force", "Flooding", or the like) among security attack operations including a set of system calls. The system call may be a minimum unit of system commands.

An attack word according to another embodiment may refer, for example, to a word associated with security. For example, the attack word may refer to a "C&C server." The "C&C server" may refer, for example, to a server that remotely controls a computer infected with a malicious code.

The attack word according to another embodiment may refer, for example, to a word associated with a system call itself. For example, the attack word may include a word such as "kill."

The attack word stored in the memory 110 may be in plural, and may be periodically updated based on information received from an external server.

The external server may refer, for example, to a web server or a data server including information about a plurality of attack words among information related to security.

According to an example embodiment, the external server may not store the system call and may provide only the contents with respect to the attack word. The external server may include a description of a main operation of the attack word, a source code for the attack word, and the like. The external server may refer, for example, to a server different from the server 300 as described above. The server 300 may transmit target information, and the external server described above may not provide target information such as the server 300, bit may simply provide information about the type and function of the attack word.

An external server according to another embodiment may refer, for example, to a web site storing a system call corresponding to an attack word. The electronic apparatus 100 may receive information corresponding to a system call corresponding to an attack word from an external server and may store the received information.

The electronic apparatus 100 may store information associated with the attack word in a memory of the electronic apparatus 100. For example, the electronic apparatus 100 may store a result in which information associated with the attack word is analyzed in a memory. The information associated with the attack word that the electronic apparatus 100 stores may be referred to as attack word information.

The attack word information may include, for example, and without limitation, at least one of an attack word type, a synonym of an attack word, a sub-word corresponding to an attack word, a weight of a sub-word, a system call pattern corresponding to the attack word, or the like.

The attack word type may refer, for example, to the type of security attack in which an attack word is used. The type of security attack may be largely classified as an attack that threatens confidentiality, an attack that threatens the integrity, and an attack that threatens availability. However, the specific type and classification criteria may vary depending on the setting of a user.

The synonym of the attack word may refer, for example, to a word having the same or similar meaning as a particular attack word. For example, assuming that there is an attack word, flooding, flood, flooded, denial-of-service (DOS), distributed DOS (DDOS), or the like, may correspond to synonyms of the attack word. The electronic apparatus 100 can monitor words corresponding to synonyms of the attack word, though not the same as the attack word, along with the attack word. The synonyms corresponding to the attack word may include a weight according to a predetermined criterion.

A sub-word corresponding to an attack word may refer, for example, to an associated word used together in a sentence including an attack word. The associated word may refer, for example, to the attack work being used in connection with a security attack. There may be a plurality of sub-words corresponding to the attack word. A more detailed description of the sub-words is provided below in the description of the processor 130.

A system call corresponding to an attack word may refer to a minimum unit of commands performed to execute an attack word. A system call corresponding to an attack word may be obtained based on information stored in an external server or internal memory.

A communication interface 120 may include various communication circuitry and may be configured to communicate with various types of external devices in accordance with various types of communication schemes. For example, the communication interface 120 may include various modules, each including circuitry, such as, for example, and without limitation, a Wi-Fi module, a Bluetooth module, an infrared communication module, a wireless communication module, etc. The Wi-Fi module, the Bluetooth module, and the Bluetooth module perform communication in the Bluetooth type and the Bluetooth method, respectively. The wireless communication module may include at least one communication chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods as described above.

The communication interface 120 may request webpage information to the server 300 through hypertext transfer protocol (HTTP), and may receive webpage information from the server 300. The communication interface 120 may transmit security information to the terminal device 200.

The processor 130 may include various processing circuitry and perform overall control operations of the electronic apparatus 100. For example, the processor 130 plays a role to control overall operations of the electronic apparatus 100.

The processor 130 may be implemented with, for example, and without limitation, at least one of a digital signal processor (DSP), a dedicated processor, a microprocessor, a graphics processing unit (GPU), an artificial intelligence (AI) processor, a time controller (TCON), or the like. The embodiment is not limited thereto, and may include, for example, one or more of a central processing unit (CPU), a micro controller unit (MCU), a micro processing unit (MPU), a controller, an application processor (AP), a communication processor (CP), an advanced reduced command set computing (RISC) machine (ARM) processor, or the like, or may be defined as a corresponding term. The processor 130 may be implemented in a system on chip (SoC) type or a large scale integration (LSI) type in which a processing algorithm is built therein or in a field programmable gate array (FPGA) type. The processor 130 may perform various functions by executing computer executable commands stored in the memory 110.

The processor 130 may be connected to the communication interface 120 and the memory 110 for controlling the electronic apparatus 100.

The processor 130 of the electronic apparatus may execute at least one instruction to obtain sequence information of the plurality of attack words based on the target information if each of the plurality of attack words stored in the memory 110 in the target information is identified by more than a predetermined number, obtain a system call pattern corresponding to the sequence information based on the information stored in the memory 110, and may control the communication interface 120 to transmit the obtained sequence information and the system call pattern to the external terminal device.

The target information may include, for example, information received from the server 300, and the target information may refer, for example, to an object that identifies whether information about the security threat is included. The processor 130 may request the target information to the server 300 in a predetermined manner and receive the target information from the server 300. For example, the processor 130 may analyze a particular webpage (corresponding to the target information) posted to the website to detect information related to a security attack at a plurality of websites (corresponding to the server 300). The particular web page may refer, for example, to various kinds of postings posted on a particular website. In one example, the processor 130 may analyze all web pages of a particular website. As another example, the processor 130 may analyze a web page posted on a particular bulletin board among a plurality of bulletin boards included in the particular website.

A method for requesting target information according to an embodiment may be to transmit a signal requesting any of a plurality of information included in the server 300 as target information. For example, if it is assumed that the server 300 is a security-related site, the processor 130 may transmit, to the server 300, a signal requesting information about any web page posted to the server 300 as target information.

A method for requesting target information according to another embodiment may be to transmit a signal requesting a data group (for example, webpage, posting, or the like) including a specific word among a plurality of information included in the server 300 as target information. For example, assuming that the server 300 is a security-related site, the processor 130 may transmit, to the server 300, a signal requesting a web page including a predetermined word (e.g., "security") among the web page posted on the server 300 as target information.

An operation of dividing overlapped target information will be described in greater detail below with reference to FIG. 18.

The processor 130 may identify whether the received target information includes information about a security threat. The processor 130 may determine target information identified as including information about a security threat among the plurality of received target information as an analysis target. In the disclosure, an operation of requesting target information and analyzing target information may be described as a monitoring operation. In addition, determining an analysis target may refer, for example, to an operation of identifying a security threat.

The security threat may refer, for example, to a security attack such as a malicious code infection or a hacking attack. The security attack may refer, for example, to a variety of ways of threatening a security target. The security attack may include an attack (e.g., snooping) that threatens confidentiality, an attack that threatens the integrity (e.g., modification, fabrication), an attack that threatens availability (e.g., DOS, interruption), and the like.

A method for determining an analysis target among the received target information (or identifying a security threat of the received target information) may be to identify whether an attack word included in the target information is greater than or equal to a predetermined number. An operation of determining an analysis target (or identifying a security threat among the received target information) may be performed using an artificial intelligence module. The artificial intelligence module may include a module that classifies target information as an analysis target and target information which is not an analysis target according to an attack word included in the target information, and can be a module learned based on the divided target information. For example, the artificial intelligence module may receive the target information as input data and obtain target information, which is the analysis target, as output data based on the received input data.

According to an embodiment, the method for determining an analysis target may be to identify whether the number of total attack words included in the target information is greater than or equal to a predetermined number. If the total number of attack words included in the target information is greater than or equal to a predetermined number, the processor 130 may determine the received target information as an analysis target. For example, the word "Brute force" may be included four times in the target information, and the word "Flooding" may be included four times. It is assumed that the predetermined number of the determination method to be analyzed is eight. Since the number of total attack words 8 included in the target information is equal to or greater than the predetermined number 8, the processor 130 may determine the received target information as an analysis target.

According to another embodiment, a method for determining an analysis target may be to identify whether a predetermined number is greater than or equal to a predetermined number for each different attack word. If the specific attack word included in the target information is greater than or equal to a predetermined number, the target information may be determined as an analysis target. For example, the word "Brute force" is included four times in the target information, and the word "Flooding" is included four times. In addition, it is assumed that the predetermined number of the determination method is 4. Since the number 4 of the first attack word included in the target information is equal to or greater than the predetermined number 4, the processor 130 may determine the target information as an analysis target.

According to another embodiment, the analysis target determination method may include identifying whether the predetermined number of each attack word is greater than or equal to a predetermined number, and the predetermined number of each attack word may be different from each other. For example, the predetermined number of "Brute force" may be 4 and the predetermined number of "Flooding" may be 3. This may be determined according to the user's settings.

If the attack word is a word associated with the system call itself, the processor 130 may perform a separate identification operation to identify whether the target information includes security threat information. A separate identification operation according to an embodiment may refer, for example, to a word included in a sentence to which a word related to a system call belongs being considered together. For example, if a word "kill" is identified, the processor 130 may determine whether the word kill is to be identified as an attack word in view of other words included in the sentence to which the word kill belongs. A separate identification operation according to another embodiment may refer, for example, to considering the type of the server 300 and the overall contents of the target information. For example, if a web server in which the web page where the word kill is identified is uploaded is a server that primarily handles security content, the processor 130 may identify that the word kill is an attack word.

The processor 130 may perform an analysis operation on the target information determined as the analysis target. The analysis operation may refer, for example, to obtaining security information in the target information. The security information may refer, for example, to sequence information of a plurality of attack words. The sequence information may refer, for example, to order information. A security attack (e.g., malware) may include a plurality of attack words and a security attack may refer, for example, to a plurality of attack words being performed sequentially. For example, a security attack may refer, for example, to the first attack word and the second attack word being performed sequentially. The sequence information may refer, for example, to the sequence information that the operation corresponding to the second attack word is performed after the operation corresponding to the first attack word is performed. As described above, a system call pattern corresponding to an attack word may be stored in the memory 110. The system call may correspond to a minimum unit of system commands. A minimum unit of system command may refer, for example, to a system call that is not decomposed into a plurality of commands on a source code. The system call may refer, for example, to an interface for accessing a kernel according to a request of an application program with respect to a service provided by a kernel of an operating system.

The system call may include a system call command. The system call command may refer, for example, to a function name of a minimum unit or a function name of a minimum unit that performs a particular operation in a system call. The minimum unit may refer, for example, to it no longer being decomposed into a plurality of operations (commands). For example, the system call command may include a word such as select, read, write, poll, sendto, or the like.

The system call pattern may refer, for example, to an order of system call commands in a minimum unit for performing an operation corresponding to an attack word in a system. For example, the order in which a system call command is performed may refer, for example, to "select->read->write->read->write->select->read->write->read->write->".

The processor 130 may obtain a system call pattern corresponding to the sequence information based on the attack word information stored in the memory 110. The system call pattern corresponding to the sequence information may refer, for example, to a system call pattern corresponding to a plurality of attack words included in the sequence information or a system call pattern for each of the plurality of attack words. For example, the sequence information may include an order of a first attack word-second attack. The processor 130 may obtain a first system call pattern corresponding to the first attack word and a second system call pattern corresponding to the second attack word based on the attack word information stored in the memory 110.

The processor 130 according to an embodiment may transmit, to the external terminal device 200 (hereinafter, the terminal device 200), the obtained sequence information and a system call pattern corresponding to the sequence information.

According to another embodiment, the processor 130 may generate a security table by combining the obtained sequence information and the system call pattern corresponding to the sequence information, and may transmit the information on the generated security table to the terminal device 200. The security table may refer, for example, to a predetermined format for storing security information (the obtained sequence information and the system call pattern corresponding to the sequence information). The processor 130 may obtain sequence information by analyzing target information received from the server 300, and obtain a system call pattern corresponding to the obtained sequence information based on the attack word information stored in the memory 110. The processor 130 may generate a security table based on the obtained sequence information and the system call pattern corresponding to the sequence information, and may transmit information corresponding to the generated security table to the terminal device 200.

The processor 130 may receive the target information from the server 300, obtain text information from the received target information, search each of the plurality of attack words in the obtained text information to identify each of the plurality of attack words, and obtain sequence information based on the order in which each of the attack words is searched from the obtained text information. The target information according to an example embodiment may include text information itself. The processor 130 may identify (or search) the attack word based on the text information included in the target information. The target information according to another embodiment may include image information. The processor 130 may obtain text information by analyzing the image information included in the target information. The processor 130 may identify (or search) the attack word based on the obtained text information.

In order to obtain sequence information for each of the plurality of attack words, the processor 130 may obtain a search location (or identification location) of the identified attack words in the target information. The processor 130 may determine the order of each of the plurality of attack words based on a search location (or an identification location). Determining each order may refer, for example, to determining the order of different attack words and may not refer to deciding an order of the same attack words. For example, the first attack word may be identified by four and the second attack words may be identified by four in the target information. The processor 130 may obtain sequence information taking into account the position in which the four first attack words and the four second attack words are located. The processor 130 may calculate an average location of the first attack word and the second attack word to obtain sequence information (the order of first attack word-second attack word). A more detailed description of obtaining sequence information will be described below with reference to FIGS. 14 and 15.

The memory 110 may store a sub-word associated with each of the plurality of attack words, the processor 130 may identify a sentence including an attack word and a sub-word associated with the attack word, among a plurality of sentences included in the target information, as a main sentence, obtain additional information associated with the attack word in the main sentence, and control the communication interface 120 to transmit, to the external terminal device 200, the obtained additional information along with the obtained sequence information and the system call pattern.

The sub-word (sub-word corresponding to the attack word) associated with the attack word may refer, for example, to an associated word used together in the sentence including the attack word. The associated word may refer, for example, to the attack word being used relative to the security attack.

The processor 130 may identify a sentence including an attack word and a sub-word corresponding to the attack word, among a plurality of sentences included in the target information, as a main sentence. For example, "Flooding" may include an association with a natural disaster in addition to a security attack in the sentence. The processor 130 needs to identify what contextual meaning the "Flooding" may have in the sentence. The processor 130 may identify whether the "Flooding" is a content for a security attack based on the words in the sentence in which the "Flooding" is used. For example, when "Flooding" is used as the meaning of security attack, the term may be frequently used along with the word launch. Thus, the sub-word of "Flooding" may be launch. If launch is included in the sentence including the "Flooding" in the target information to be monitored, the processor 130 can identify that the corresponding sentence is a main sentence related to the security attack.

A plurality of sub-words corresponding to an attack word may be used. If the sub-words are in plural, weights can be set differently. The processor 130 may obtain a sentence including at least one of a plurality of sub-words corresponding to an attack word and an attack word among a plurality of sentences included in the target information. The processor 130 may identify a sentence including a sub-word having a high weight among a sub-word in the obtained sentence as a main sentence.

For example, there are sub-words of launch, attack, and execute for "Flooding." The word "flooding" can be analyzed to have a high probability of including the meaning of a security attack when used in conjunction with the word launch. In this case, the processor 130 may assign the highest weight to launch. The weights corresponding to the attack words may be different for each of the plurality of sub-words. If the attack word "Flooding" and the sub-word "launch" are included in the same sentence, the processor 130 can identify the sentence as the main sentence. The main sentence may refer, for example, to the sentence being most important in at least one sentence in which an attack word is included.

The memory 110 may store a plurality of sub-words related to at least one attack word, among a plurality of attack words, and weight information corresponding to each of a plurality of sub-words, and if an attack word "Flooding" and a first sub-word "launch" related to the attack word are identified in the first sentence, and an attack word "Flooding" and a second sub-word "attack" related to the attack word are identified in the second sentence, among a plurality of sentences included in the target information, the processor 130 may identify a sentence including the sub-word ("launch") having a high weight among the first and second sub-words as the main sentence based on the weight information.

If a sentence including an attack word and a sub-word associated with the attack word are identified among the plurality of sentences included in the target information, the processor 130 may identify a part of speech of the sub-word, and if the identified part of speech of the sub-word is a verb, the processor 130 may identify the identified sentence as a main sentence.

Two sub-words corresponding to an attack word may be identified in one sentence. When two or more sub-words corresponding to an attack word are identified in one sentence, the processor 130 can identify the closest sub-word as a representative sub-word in consideration of the word position of the attack word. The processor 130 may perform a main sentence identification operation based on a representative sub-word among a plurality of sub-words.

At least one main sentence may be obtained, and if the sub-word is not identified, the main sentence may not be obtained. An operation of identifying a main sentence will be described in greater detail below with reference to FIG. 16.

The processor 130 may obtain additional information in the main sentence among the plurality of sentences included in the target information. The additional information may include, for example, and without limitation, at least one of an Internet protocol (IP) address, universal resource locator (URL) information, attack target information associated with the attack word, or the like. The attack target information may refer, for example, to a main target of the security attack. For example, the attack target information may be a bank, a public institution, a shopping mall, a specific SNS site, an Internet of things (IoT) device, a router model, or the like.

The processor 130 may obtain security information from the target information. The security information may include at least one of an attack name, an order of an attack word (sequence information), a system call pattern corresponding to an attack word (or a system call pattern corresponding to sequence information), a main sentence, or security attack-related information.

The operation (analysis operation) of obtaining security information from the target information may be performed using an artificial intelligence module. The artificial intelligence module may be a module trained based on the total data of the target information and various security information included in the target information. Specifically, the artificial intelligence module may receive the target information as input data and obtain security information as output data based on the received input data. As a result, the attack name corresponding to the security information, the order of the attack word (sequence information), the system call pattern corresponding to the attack word (or the system call pattern corresponding to the sequence information), the main sentence, and the security attack-related information can be obtained by the artificial intelligence module.

The processor 130 may store the security information obtained from the target information in the memory 110 as a predetermined format. The system call pattern, among the security information, may be stored in various formats.

According to an embodiment, a format may be a format respectively storing a system call pattern by operating systems. The system call patterns may be different for each operating system and the processor 130 may store each system call pattern by a plurality of operating systems in the memory 110. A more detailed description will be provided below with reference to FIG. 20.

The format according to another embodiment may include a format that stores a system call pattern based on a system call command that is common by the operating systems. If the operating systems are different, system call commands commonly obtained in different system call commands may be identified, and the system call may be stored based on the identified system call commands A more detailed description will be provided below with reference to FIG. 21.

The format according to a still another embodiment may include a format in which a system call pattern is stored based on a predefined translation word (or transformation word or changing word).

The processor 130 may generate a security pattern by changing the system call command included in the system call pattern corresponding to each of the plurality of attack words into a predefined translated word based on the translation information, and control the communication interface 120 to transmit the translation information and the generated security pattern to the external terminal device 200, and the translation information may include a plurality of predefined translated words corresponding to the system call command of each of the plurality of operating systems, the first translated word among the plurality of predefined translated words may correspond to the first system call command of the first operating system and the second system call command of the second operating system, and the first operating system may be different from the second operating system. The translation information may include information for translating a system call command corresponding to each of a plurality of operating systems into a predefined translated word.

The translation word may refer, for example, to a word set by a user to unify system call commands of different operating systems to a single word. The translation word is expressed as a translation word, but may be used as a translation number in actual implementation.

The translation information may refer to information about to which translation word (or translation number) the system call command of a specific operating system may be translated. The translation information may include a translation word and system call commands for each operating system corresponding to a predetermined translation.

The security pattern may refer, for example, to translating the system call pattern based on the translation word. The pattern after the translation operation may be referred to as a security pattern to be distinguished from the system call pattern. The system call pattern includes a system call command, but the security pattern may include a translation word.

The processor 130 may transmit, to the terminal device 200, the translation information and the security pattern generated based on the translation information. The information on the operating system of the terminal device 200 should be included in the translation information. If no system call command information corresponding to the operating system of the terminal device 200 exists in the translation information, the terminal device 200 may not interpret the generated security pattern based on the translation word.

A more detailed description regarding the translation word will be described below with reference to FIG. 22.

In the field of security, a general user can be informed of security-related information belatedly in that an attempt related to a malicious code, a hacking threat is rapidly changing. According to the embodiment, a security server as a main actor may monitor security issues that have recently occurred on the Internet. The monitoring operation according to the disclosure can quickly collect information about newly-known security attacks.

Figure 3:
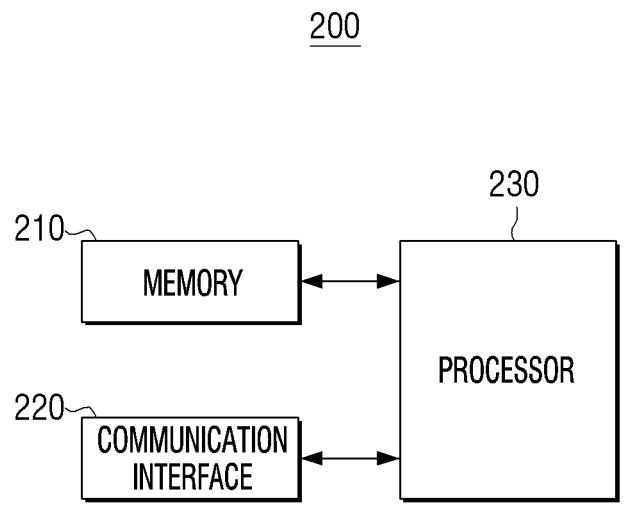
FIG. 3 is a block diagram illustrating an example terminal device according to an embodiment.

FIG. 3 is a block diagram illustrating an example terminal device according to an embodiment.

Referring to FIG. 3, the terminal device 200 may include the memory 210, the communication interface (e.g., including communication circuitry) 220, and the processor (e.g., including processing circuitry) 230.

The terminal device 200 of FIG. 2 may include components that perform similar operations to the electronic apparatus 100, and thus, overlapped detailed description thereof may not be repeated here. According to an embodiment, in order to distinguish each component of the electronic apparatus 100 and the terminal device 200, the electronic apparatus 100 can be described as a memory of the electronic apparatus 100 and a memory type of the terminal device 200. However, in order to avoid overlapping words according to another embodiment, the memory 110 and a memory 210 may be described.

The memory 210 of the terminal device 200 may store at least one command, sequence information of a plurality of attack words, and a system call pattern related to the sequence information.

The communication interface 220 of the terminal device 200 may include various communication circuitry and receive, from the external server, sequence information of the plurality of attack words and the system call pattern related to the sequence information. The external server may refer, for example, to the electronic apparatus 100.

The processor 230 of the terminal device 200 may include various processing circuitry and be connected to the communication interface 220 and the memory 210 for controlling an electronic apparatus (terminal device 200).

When sequence information of a plurality of attack words and a system call pattern related to the sequence information are received from an external server, the processor 230 of the terminal device can store, in the memory 210, the same (the sequence information of the plurality of attack words and the system call pattern related to the sequence information), by executing at least one command, compare the system call command sequentially generated in the terminal device with the stored sequence information and the stored system call pattern, and perform a security operation based on a comparison result, and when each of the plurality of attack words is identified in the target information by more than a predetermined number, the sequence information of a plurality of attack words and a system call pattern related to the sequence information may be generated in the external server.

The external server may refer, for example, to the electronic apparatus 100.

The processor 230 may request a system call pattern associated with the sequence information and sequence information of the plurality of attack words to the electronic apparatus 100 or receive from the electronic apparatus 100 based on a predetermined cycle. The processor 230 may store the received sequence information of a plurality of attack words and a system call pattern associated with the sequence information in the memory 210. The sequence information and the system call pattern related to the sequence information may be recited as security information, and can be recited as information corresponding to a security table generated in a predetermined format.

The processor 230 may obtain sequence information of a plurality of attack words and a system call pattern corresponding to sequence information associated with a security attack in the security information or security table. The system call pattern corresponding to the sequence information may refer, for example, to a system call pattern determined based on the sequence information for the plurality of attack words.

The processor 230 may obtain a system call internally generated in the system. The system call generated in the internal system of the terminal device 200 may be described as an internal system call. The processor 230 may compare the internal system call with a system call pattern corresponding to sequence information of a plurality of attack words received from the electronic apparatus 100.

The system call pattern may include sequence information associated with commands of a minimum unit to perform an operation corresponding to the attack word in the terminal device.

The sequence information is the sequence information of the plurality of attack words related to the security attack, and the processor 230 of the terminal device may perform a security operation corresponding to the identified security attack if the security attack corresponding to the sequence information is identified based on the comparison result.

After the system call pattern corresponding to one of the plurality of attack words is executed, the processor 230 of the terminal device may identify that a security attack corresponding to the sequence information is in progress if at least some system call commands included in the system call pattern corresponding to the next attack word according to the sequence information are generated in the terminal device, and may perform a security operation corresponding to the identified security attack.

The sequence information may include a first attack word and a second attack word, and the system call pattern related to the sequence information may include a first system call pattern corresponding to the first attack word and a second system call pattern corresponding to the second attack word, and each of the first system call pattern and the second system call pattern may include a plurality of system call commands, and the processor 230 of the terminal device may, after the plurality of system call commands included in the first system call pattern are executed, identify that a security attack corresponding to the sequence information is in progress if some of the plurality of system call commands included in the second system call pattern are identified to be executed in the terminal device.

The processor 230 of the terminal device may receive and store a plurality of sequence information and a system call pattern associated with the plurality of sequence information from an external server in the memory 210, the processor 230 of the terminal device may identify at least one sequence information of the plurality of sequence information based on a system call command sequentially generated at the terminal device, compare the at least one identified sequence information and the stored system call pattern, perform a security operation based on a comparison result, and the security attacks corresponding to the plurality of sequence information may be different.

If it is identified (determined) that the first security attack corresponding to the first sequence information among the plurality of sequence information is in progress, the processor 230 of the terminal device can perform the first security operation, and if the second security attack corresponding to the second sequence information among the plurality of sequence information is identified as being in progress, the processor 230 may perform a second security operation, and the first security operation can be different from the second security operation. The processor 230 of the terminal device may calculate the similarity between the internal system call and the system call pattern received from the electronic apparatus 100. How much the system call command occurring sequentially inside is similar to the system call pattern stored in the memory 210 may be identified, and if the similarity is greater than or equal to the threshold, it may be identified that there is a security threat in the terminal device 200.

The security information received from the electronic apparatus 100 may include information related to a particular security attack. For example, attack techniques for security attacks may be listed in order. Various attack techniques may be described as attack words. According to order information (sequence information) for a plurality of attack words, the terminal device 200 can identify that there is a security threat when a plurality of attack words are executed in sequence. Whether a plurality of attack words are executed in sequence can be identified by comparing the system call commands. If the attack technique corresponding to the plurality of attack words is to be performed, the internal system call of the terminal device 200 needs to be performed. The terminal device 200 may identify whether a specific attack technique (a system call pattern corresponding to an attack word) is being performed in the terminal device 200 by obtaining the order of generation the internal system call. Based on the particular attack technique being performed at the terminal device 200, the processor 230 of the terminal device may identify the security threat.

According to an embodiment, if the system call based on the internal system call matches a system call pattern corresponding to two attack words, the processor 230 of the terminal device may identify the security threat. For example, the system call pattern corresponding to the first attack word may be "A-B-C" and the system call pattern corresponding to the second attack word may be "D-E-F." If the processor 230 of the terminal device identifies that the internal system call command is "A-B-C-D-E-F", the processor 230 of the terminal device may identify that the system call pattern corresponding to the first attack word and the second attack word is the same. The processor 230 of the terminal device may identify that the attack technique for the first attack word and the second attack word is being performed in the terminal device 200 and may identify that there is a security threat to the terminal device 200.

After the system call pattern corresponding to any one of a plurality of attack words is executed, the processor 230 of the terminal device according to another embodiment may perform a security operation if it is determined that at least some of the system calls included in the system call pattern corresponding to the next attack word according to the sequence information are generated. For example, if one attack technique is identified by the processor 230 of the terminal device, the processor 230 can identify that there is a security threat to the terminal device 200 even when the internal system call is only partially identical to the second attack technique. For example, the system call pattern corresponding to the first attack word may be "A-B-C" and the system call pattern corresponding to the second attack word may be "D-E-F". If the processor 230 of the terminal device identifies that the internal system call command is "A-B-C-D-E", the processor 230 of the terminal device may identify a system call pattern corresponding to the first attack word and may assume (or predict) a system call pattern corresponding to the second attack word. If the similarity is greater than or equal to a threshold value based on the similarity between the above-described system call commands, the processor 230 of the terminal device may identify that there is a security threat to the terminal device 200.

According to another embodiment, if the system call pattern corresponding to a specific attack word is identified, the processor 230 may identify that there is a security threat to the terminal device 200. If the internal system call command is "A-B-C" in the above-described embodiment, the processor 230 of the terminal device may identify the terminal device 200 has a security threat.

According to the embodiments described above, identifying that there is a security threat when a system call pattern corresponding to at least one attack word is identified is described. However, the processor 230 of the terminal device may identify the security threat based solely on the order of the particular system call rather than the attack word unit in the actual implementation. If the internal system call command is "A-B" in the above-described embodiment, the processor 230 of the terminal device may identify that there is a security threat to the terminal device 200.

The translation information, the translation word, and the security pattern have been described with reference to FIG. 2 and will not be further described here.

The system call pattern received from the external server (electronic apparatus 100) may be a security pattern changed to a predefined translation word based on the translation information, the processor 230 of the terminal device may receive the translation information and the security pattern from the external server, translate the security pattern into a system call pattern corresponding to the operating system of the terminal device based on the received translation information and the operating system of the terminal device, and may compare the system call command sequentially generated in the terminal device with the stored sequence information and the translated system call pattern, and the translation information may include information for translating a system call command corresponding to each of the plurality of operating systems into a predefined translation word.

In a case where both the translation information and the security pattern are received at the terminal device 200, the translation information and the security pattern may be transmitted to the terminal device 200 at the same time according to an example embodiment. However, according to another embodiment, the security pattern may be transmitted to the terminal device 200 while the translation information is pre-stored in the terminal device 200.

The processor 230 of the terminal device may translate the security pattern to the system call pattern corresponding to the operating system of the electronic apparatus (terminal device 200) based on the operating system of the electronic apparatus (terminal device 200) and the received translation information.

Since the security pattern is simply a pattern including a translation word, the processor 230 of the terminal device needs to translate the security pattern into a general system call pattern based on the translation information. The processor 230 of the terminal device can use a system call command suitable for the operating system of the terminal device 200. Accordingly, the translation information may be information in which a system call command corresponding to the operating system of the terminal device 200 is described.

The electronic apparatus (terminal device 200) may compare the sequentially generated system call command with the stored sequence information and the translated system call pattern, the translation information may include a plurality of predefined translation words corresponding to a system call command of each of the plurality of operating systems, a first translation word among the plurality of predefined translation words may correspond to a first system call command of the first operating system and a second system call command of the second operating system, and the first operating system may be different from the second operating system.

If the security threat is identified, the processor 230 of the terminal device may perform a security operation. The security operation may be an operation to provide a warning user interface (UI) to a display of the terminal device 200 or to provide a voice notification through a speaker. The security operation may be to control the communication interface 220 of the terminal device 200 to block all of the network connections. The security operation may be to transmit at least one of information that the security threat has been identified and information about the identified system call pattern to the electronic apparatus 100.

A more detailed operation of the terminal device will be described below with reference to FIG. 9.

A simple configuration of the terminal device 200 has been illustrated and described but in implementation, various configurations can be additionally provided.

The terminal device 200 may include a memory 210, a communication interface (e.g., including communication circuitry) 220, a processor (e.g., including processing circuitry) 230 of the terminal device, a user interface (not shown), an input/output interface (not shown), and a display (not shown).

An operation of the memory 210, the communication interface 220, and the processor 230 of the terminal device which are the same as or similar to the operation described above will not be described.

The communication interface 220 may include various communication circuitry including, for example, at least one of a wired communication module performing communication using a pair cable, co-axial cable, an optical cable, Ethernet module, or a local area network (LAN) module.

The user interface (not shown) may be implemented using a device such as at least one of a button, a touch pad, a mouse, a keyboard, or a touch screen capable of performing the above-described display function and operation input function. The button may include various types of buttons such as at least one of a mechanical button, a touch pad, a wheel, or the like, formed in an arbitrary region such as at least one of a front portion, a side portion, a back portion, or the like, of the outer surface of the main body of the terminal device 200.

The input/output interface (not shown) may include various input/output circuitry and include at least one of a high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The input/output interface (not shown) may input or output at least one of an audio signal and a video signal.

According to an embodiment, an input/output interface (not shown) may separately include a port for inputting only an audio signal and a port for inputting only a video signal, or may be implemented with a port for inputting and outputting both an audio signal and a video signal.

The display (not shown) includes a display panel to output an image. The display (not shown) may be implemented as various types of displays such as, for example, and without limitation, a liquid crystal display (LCD) panel, organic light emitting diodes (OLED) display panel, a plasma display panel (PDP), and the like. In the display (not shown), a driving circuit that can be implemented using one or more of an a-Si thin film transistor (TFT), a low temperature poly silicon (LTPS) TFT, an organic TFT (OTFT), and a backlight may be included. Further, the display (not shown) may be implemented as at least one of a touch screen coupled with a touch sensor, a flexible display, a three-dimensional (3D) display, or the like.

According to an embodiment, the display (not shown) may include not only a display panel to output an image but also a bezel that houses a display panel. In particular, the bezel according to an embodiment may include a touch sensor (not shown) for sensing a user interaction.

Figure 4:
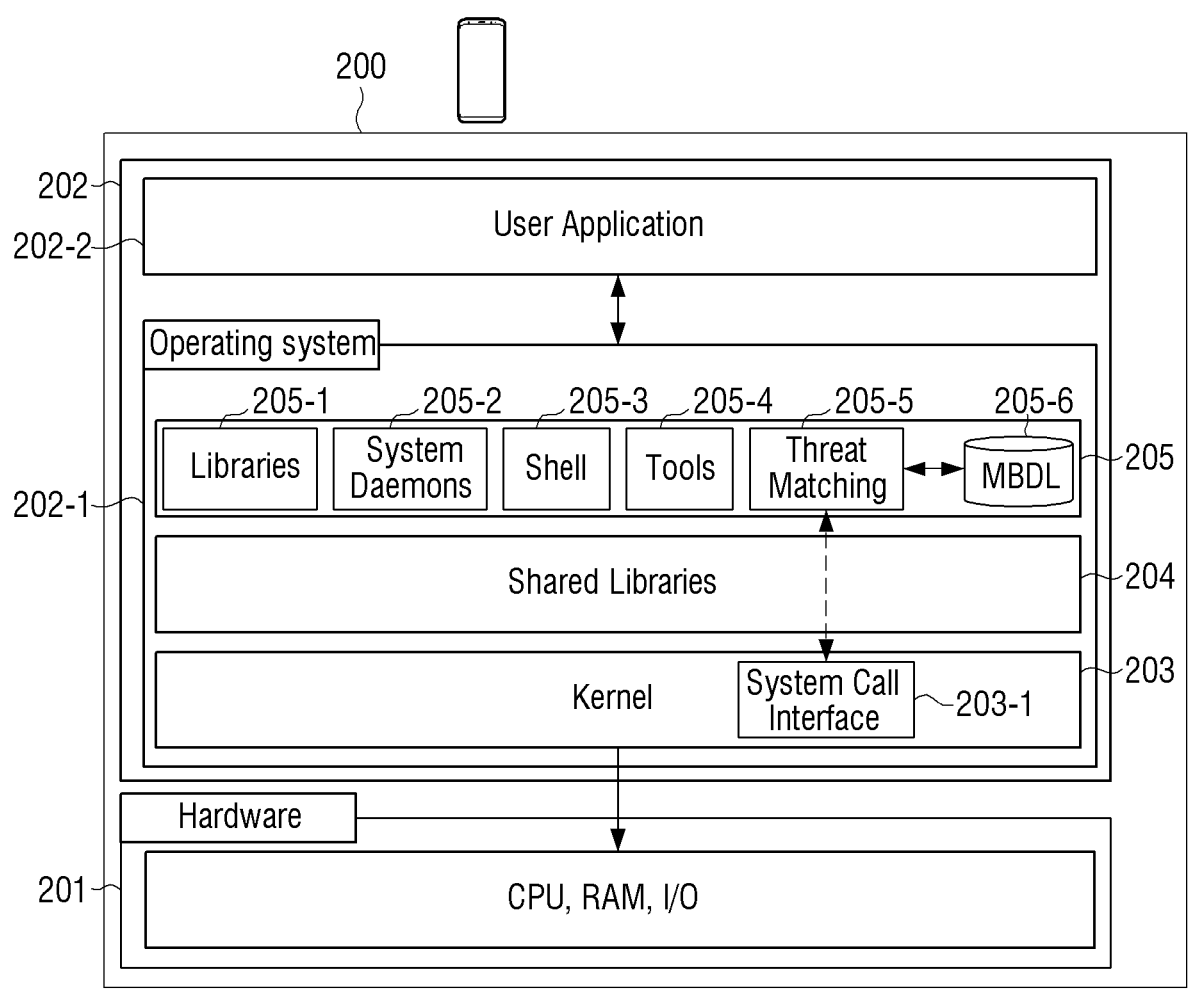
FIG. 4 is a block diagram illustrating an example attack analysis operation according to an example structure of an operating system of a terminal device according to an embodiment.

FIG. 4 is a block diagram illustrating an example attack analysis operation according to a structure of an operating system of a terminal device according to an embodiment.

Referring to FIG. 4, the terminal device 200 may include a hardware 201 and software 202.

The hardware 201 of the terminal device 200 may include, for example, and without limitation, a central processing unit (processor), a random access memory (RAM), an input/output interface, etc. A description of the hardware 201 of the terminal device 200 has been illustrated in FIG. 3 and will not be further described.

The software 202 of the terminal device 200 may include, for example, and without limitation, an operating system 202-1 and a user application program 202-2.

The operating system 202-1 of the terminal device 200 may include, for example, and without limitation, at least one of a kernel 203, a shared library 204, a system framework 205, etc. The operating system 202-1 may be implemented in a form in which the system framework 205 is omitted according to the type of the operating system.

The kernel 203 may include a computer program that controls the system in a computer operating system and provides various services. The kernel 203 may manage the resources of the system. For example, the kernel 203 may manage the allocation problem of the memory and process of the system, determine the order using the CPU, and manage the access rights of the system. The kernel 203 may provide an interface for a physical device based on a device driver. The kernel 203 may be implemented as a monolithic kernel, a microkernel, a hybrid kernel, a nanokernel, an exokernel, and may be implemented in a variety of kernels other than those described above. The kernel 203 may include a system call interface 203-1. The system call interface 203-1 may be an interface that is connected to a kernel in a process or thread.

The shared library 204 may refer to a library that is simultaneously used in a plurality of processes. The library may refer, for example, to a non-volatile resource collection, such as a standardized program and subroutine, for efficiently utilizing a computer.

The system framework 205 may include, for example, and without limitation, at least one of a library 205-1, a system daemon 205-2, a shell 205-3, a tool 205-4, or the like. The system framework 205 may be a software environment that provides a plurality of functions of the software in a coordinated form to be reusable. The library 205-1 may refer to a collection of information about a necessary function to be repeatedly used. The system daemon 205-2 may refer, for example, to a background program. The shell 205-3 may include a program that provides an interface for implementing various functions and services in the operating system. The tool 205-4 may include a programming tool or a software tool. The tool 205-4 may include a program that is generated to easily create a development program and can be used to maintain and repair a development program.

The system framework 205 of the terminal device 200 may further include a threat matching module 205-5 and a malicious behavior description language (MBDL) module 205-6.

The threat matching module 205-5 may refer, for example, to a module for comparing security information (sequence information of a plurality of attack words and a system call pattern) received from the electronic apparatus 100 and a system call command internally generated in the system.

The MBDL module 205-6 may be a module in which security information (sequence information of a plurality of attack words and a system call pattern) is stored in a predetermined format. The contents associated with the predetermined format will be described in greater detail below with reference to FIGS. 19-22.

The security matching module 205-5 may request security information to the MBDL module 205-6 to obtain security information, and the MBDL module 205-6 may provide security information to be compared based on the request of the threat matching module 205-5. The threat matching module 205-5 may obtain the internally generated system call pattern through the system call interface 203-1. With the threat matching module 205-5 assigned to the memory 210 of the terminal device 200, the threat matching module 205-5 may obtain security information from the MBDL module 205-6 and obtain internally generated system call commands from the system call interface 203-1. The threat matching module 205-5 may compare the obtained security information and the internally generated system call pattern to identify a security threat.

The user application program 202-2 may refer to software, of all software running on the operating system that allows a user to use directly. The user application program 202-2 may refer to a program developed to allow a user to perform a specific task process using a computer. A control signal generated in the user application program 202-2 may be transferred to the operating system 202-1 to perform a specific task process. If a particular task process is associated with hardware, the control command generated in the user application program 202-2 may be transmitted to the hardware 201 through the operating system 202-1 FIG. 5 is a block diagram illustrating a security system by dividing into software and hardware according to an embodiment.

Figure 5:
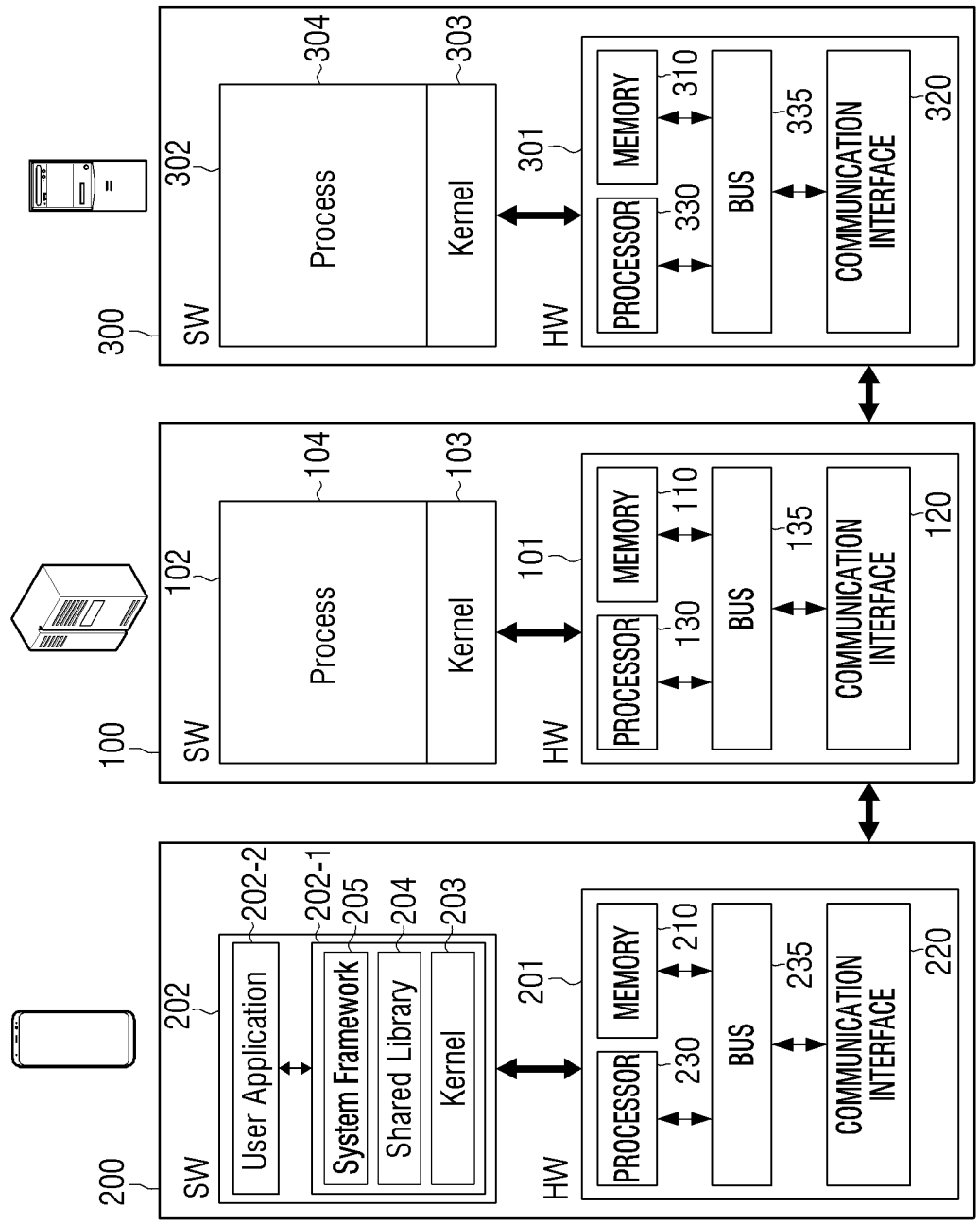
FIG. 5 is a block diagram illustrating an example security system which is divided into a software and a hardware according to an embodiment.

Referring to FIG. 5, the electronic apparatus 100, the terminal device 200, and the server 300 may include hardware and software respectively.

The electronic apparatus 100 may include the hardware 101 and the software 102. The hardware 101 of the electronic apparatus 100 may include the memory 110, the communication interface 120, the processor 130, and a bus 135. Since the hardware 101 of the electronic apparatus 100 has been described in detail with reference to FIG. 2 above, a detailed description thereof will not be repeated here. The bus 135 may be a communication system that transmits data between components of computer hardware. The software 102 of the electronic apparatus 100 may refer to an operating system and the software 102 of the electronic apparatus 100 may include the kernel 103 and a process 104. The kernel 103 may be a computer program that controls the system in a computer operating system and provides various services and may correspond to the kernel 203 described in FIG. 4. The process 104 may be a program running continuously on a computer. The process 104 may refer to a unit of tasks that are executed on the memory 110.

The terminal device 200 may include the hardware 201 and the software 202. The hardware 201 of the terminal device 200 may include the memory 210, the communication interface 220, the processor 230, and the bus 235. The software 202 of the terminal device 200 may include the operating system 202-1 and the user application program 202-2. The operating system 202-1 may also include at least one of the kernel 203, the shared library 204, or the system framework 205. Since the hardware 201 and the software 202 of the terminal device 200 have been described with reference to FIGS. 3 to 4, a detailed description thereof will not be repeated here.

The server 300 may include hardware 301 and software 302. The hardware 301 of the server 300 may include a memory 310, a communication interface 320, a processor 330, and a bus 335. The software 302 of the server 300 may include a kernel 303 and a process 304. The description of the hardware 301 and software 302 of the server 300 may correspond to the hardware 101 and software 102 of the electronic apparatus 100. Accordingly, a detailed description thereof will not be repeated here.

The electronic apparatus 100 may store attack word information in the memory 110 which is one of the element of the hardware 101 of the electronic apparatus 100.

The electronic apparatus 100 may monitor the target information. For example, if it is desired to perform monitoring of the target information in the process 104 of the electronic apparatus 100, the process 104 may generate information about the control signal (hereinafter, a first control signal) requesting the target information, and may transmit information about the first control signal requesting the target information to the hardware 101 of the electronic apparatus 100 through the kernel 103. The electronic apparatus 100 may transmit a first control signal requesting the target information to the server 300 through the communication interface 120 of the electronic apparatus 100.

The server 300 may receive the first control signal requesting target information transmitted from the electronic apparatus 100 through the communication interface 320 of the server 300. The server 300 may transmit the first control signal requesting target information to the software 302 of the server 300 from the communication interface 320 of the server 300 to analyze the received first control signal. The process 304 of the server 300 may generate a control signal (hereinafter, a second control signal) that controls the transmission of target information corresponding to the received first control signal from the memory 310 of the server 300. The process 304 of the server 300 may then transmit the generated second control signal to the hardware 301 of the server 300 through the kernel 303 of the server 300. The server 300 may obtain the target information corresponding to the second control signal from the memory 310 of the server 300, and transmit the obtained target information to the electronic apparatus 100 through the bus 335 of the server 300 and the communication interface 320 of the server 300.

The communication interface 120 of the electronic apparatus 100 may receive target information from the server 300. The target information may then be transmitted to the software 102 of the electronic apparatus 100 through the communication interface 120, the bus 135, and the memory 110 of the electronic apparatus 100. In this process, the target information may be stored in the memory 110 of the electronic apparatus 100. The process 104 of the electronic apparatus 100 may perform an operation to analyze the target information and use the processor 130 and the target information stored in the memory 110 of the electronic apparatus 100 to analyze the target information. The process 104 may use the processor 130 to generate security information (or security tables) based on the target information, and the generated security information may be stored in the memory 110 of the electronic apparatus 100. The process 104 may then transmit the security information stored in the memory 110 of the electronic apparatus 100 to the terminal device 200 using the communication interface 120 of the electronic apparatus 100.

The communication interface 220 of the terminal device 200 can receive security information from the electronic apparatus 100, and the terminal device 200 may store the received security information in the memory 210 of the terminal device 200. The MBDL module 205-6 included in the system framework 205 of the terminal device 200 may translate the security information received from the electronic apparatus 100 into a predetermined format and store the translated security information in the memory 210 of the terminal device 200.

The terminal device 200 may perform a system call analysis operation in real time. For example, the system framework 205 of the terminal device 200 may include the threat matching module 205-5 and the MBDL module 205-6. The threat matching module 205-5 may obtain the internally generated system call through the system call interface 203-1 of the kernel 203 and compare the obtained system call with security information in a predetermined format that is stored in the MBDL module 205-6. The terminal device 200 may identify a security threat using the threat matching module 205-5 and the MBDL module 205-6. When the security threat is identified through the system call analysis, the terminal device 200 can perform a security operation corresponding to the identified security threat.

Figure 6:
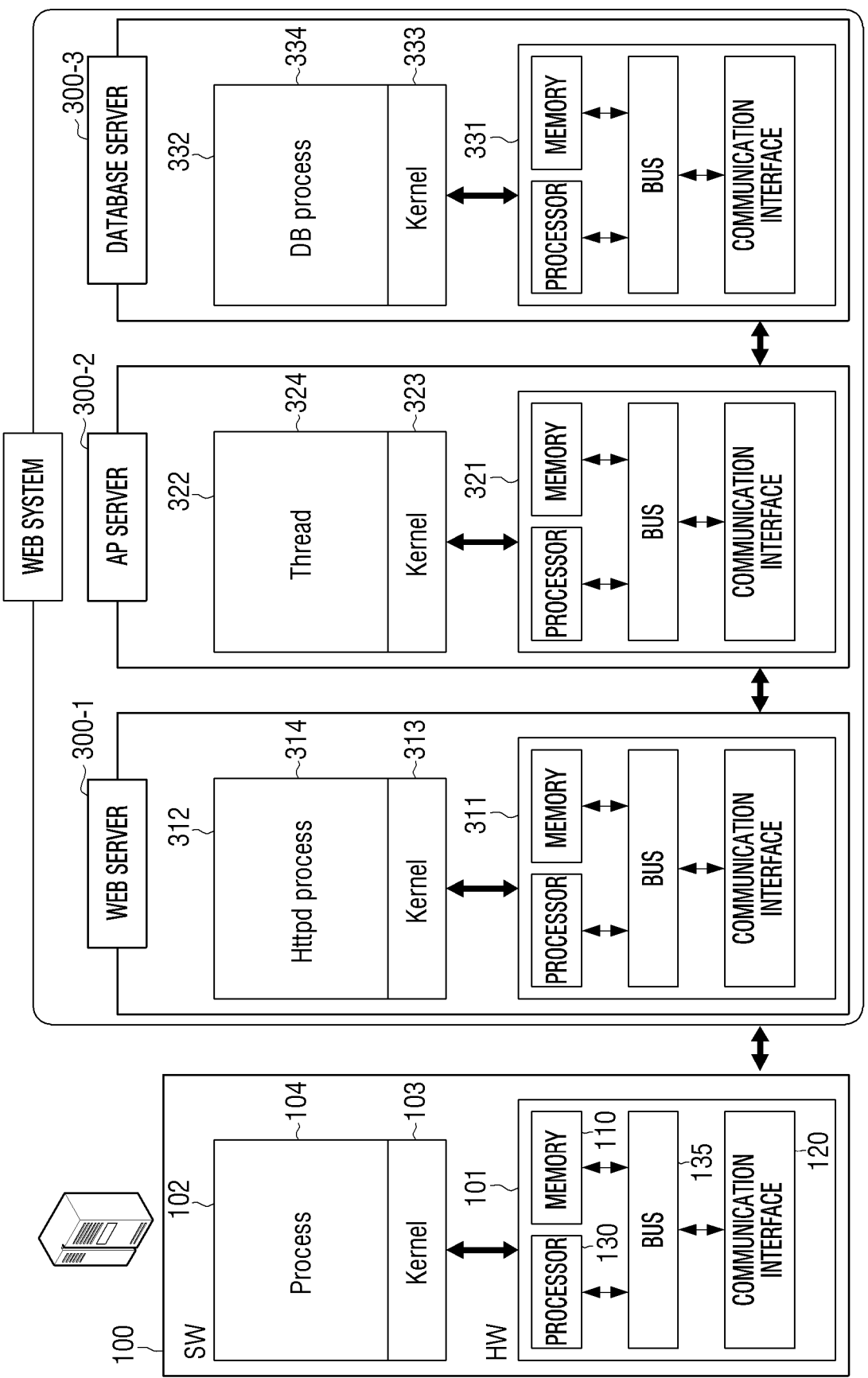
FIG. 6 is a block diagram illustrating an example structure of an electronic apparatus and a web system according to an embodiment.

FIG. 6 is a block diagram illustrating an example structure of an electronic apparatus and a web system according to an embodiment.

Referring to FIG. 6, the electronic apparatus 100 may receive target information from a web system. A description of the electronic apparatus 100 has been described with reference to FIGS. 2 and 5 and thus, an overlapped description will not be repeated here.

The web system may include the web server 300-1, an AP server 300-2, and a database server 300-3.

The electronic apparatus 100 may transmit a request for target information (e.g., a webpage) to the web server 300-1. The electronic apparatus 100 may monitor the target information. If it is desired to perform monitoring of the target information in the process 104 of the electronic apparatus 100, the process 104 may generate information about the control signal (hereinafter, the first control signal) requesting the target information, and may transmit information about the first control signal requesting the target information to the hardware 101 of the electronic apparatus 100 through the kernel 103. The electronic apparatus 100 may transmit the first control signal requesting the target information to the web server 300-1 through the communication interface 120 of the electronic apparatus 100.

The web server 300-1 may include hardware 311 and software 312.

The hardware 311 of the web server 300-1 may include a processor, memory, bus, and communication interface. A description of the hardware 311 of the web server 300-1 may correspond to the hardware configuration of the electronic apparatus 100 and will not be further described.

The software 312 of the web server 300-1 may include the kernel 313 and an http daemon (Httpd) process 314. Since the software 312 of the web server 300-1 can correspond to the software 102 of the electronic apparatus 100, a detailed description thereof will not be repeated here. The Httpd process 314 may be a process which can be executed in the background of the web server 300-1 to process Http. The Httpd process 314 may provide content such as text, images, videos, or the like, using http.

The web server 300-1 may receive the first control signal requesting target information through a communication interface of the web server 300-1. The first control signal may then be transmitted to the httpd process 314 of the web server 300-1 through the kernel 313 of the web server 300-1. The httpd process 314 of the web server 300-1 can identify whether the target information is static content or dynamic content based on the received first control signal. The static content may refer, for example, to content (data) that does not need to be changed in real time. The dynamic content may refer to data that is changed with a high frequency. The static content may refer to content in which the same data is returned (or provided) regardless of the request. For example, the static content may include a text, an image, a document, or the like. The dynamic content may also refer to content in which different data is returned in response to context, time, and request.

If the httpd process 314 of the web server 300-1 identifies that the target information requested by the first control signal is the static content, the httpd process 314 of the web server 300-1 can obtain the content corresponding to the target information stored in the memory of the web server 300-1, and return the content corresponding to the obtained target information to the electronic apparatus 100 through the communication interface of the web server 300-1.

If the httpd process 314 of the web server 300-1 identifies that the target information requested by the first control signal is dynamic content, the httpd process 314 of the web server 300-1 can generate a control signal (third control signal) requesting target information to the AP server 300-2. The web server 300-1 can transmit the generated third control signal to the AP server 300-2 through the communication interface of the web server 300-1.

The AP server 300-2 may include hardware 321 and software 322.

The hardware 321 of the AP server 300-2 may include the processor, memory, bus, and communication interface. A description of the hardware 321 of the AP server 300-2 may correspond to the hardware configuration of the electronic apparatus 100 and will not be further described.

The software 322 of the AP server 300-2 may include a kernel 323 and a thread 324. The software 322 of the AP server 300-2 may correspond to the software 102 of the electronic apparatus 100, and thus a detailed description thereof will not be repeated here. Thread 324 may be a smaller unit of flow within the process.

The communication interface of the AP server 300-2 may receive the third control signal from the web server 300-1 and transmit the same (the received third control signal) to the thread 324 of the AP server 300-2. The thread 324 of the AP server 300-2 can identify whether target information (dynamic content) corresponding to the third control signal is data that is returned by itself to the AP server 300-2 or data required for connection to the database server 300-3.

If the target information (dynamic content) is data that can be returned by itself to the AP server 300-2, the thread 324 of the AP server 300-2 can return target information (dynamic content) to the web server 300-1 through the kernel 323 of the AP server 300-2 and the communication interface of the AP server 300-2. The web server 300-1 can return dynamic content to the electronic apparatus 100.

If the AP server 300-2 cannot directly return the target information (dynamic content), the AP server 300-2 may generate a fourth control signal requesting specific information to the database server 300-3. The thread 324 of the AP server 300-2 may transmit the generated fourth control signal to the database server 300-3 through the kernel 323 of the AP server 300-2 and the communication interface of the AP server 300-2.

The database server 300-3 may include hardware 331 and software 332.

The hardware 331 of the database server 300-3 may include the processor, memory, bus, and communication interface. A description of the hardware 331 of the database server 300-3 may correspond to the hardware configuration of the electronic apparatus 100 and an overlapped description will not be repeated here.

The software 332 of the database server 300-3 may include the kernel 333 and the database process 334. The software 332 of the database server 300-3 may correspond to the software 102 of the electronic apparatus 100, and thus a detailed description thereof will be omitted. The database process 334 may refer to a process of providing data in response to a request.

The communication interface of the database server 300-3 may receive a fourth control signal from the AP server 300-2 and pass the four control signal to the DB process 334 of the database server 300-3. The DB process 334 of the database server 300-3 can check whether specific information corresponding to the fourth control signal exists in the cache. If certain information is present in the cache, the DB process 334 of the database server 300-3 may obtain specific information in the cache and return the specific information to the AP server 300-2 through the communication interface of the database server 300-3. If certain information is not present in the cache, the DB process 334 may obtain specific information from the memory of the database server 300-3 and return the obtained specific information to the AP server 300-2 through the communication interface of the database server 300-3.

The AP server 300-2 may transmit the specific information received from the database server 300-3 to the thread 324 of the AP server 300-2, and the thread 324 of the AP server 300-2 can generate the target information using the specific information. The thread 324 of the AP server 300-2 may transmit the target information generated through the kernel 323 of the AP server 300-2 and the communication interface of the AP server 300-2 to the web server 300-1.

The web server 300-1 may return the received target information to the electronic apparatus 100 through the communication interface of the web server 300-1.

The electronic apparatus 100 may include a server receiving target information which is the static content or target information which is the dynamic content through the web server system.

Figure 7:
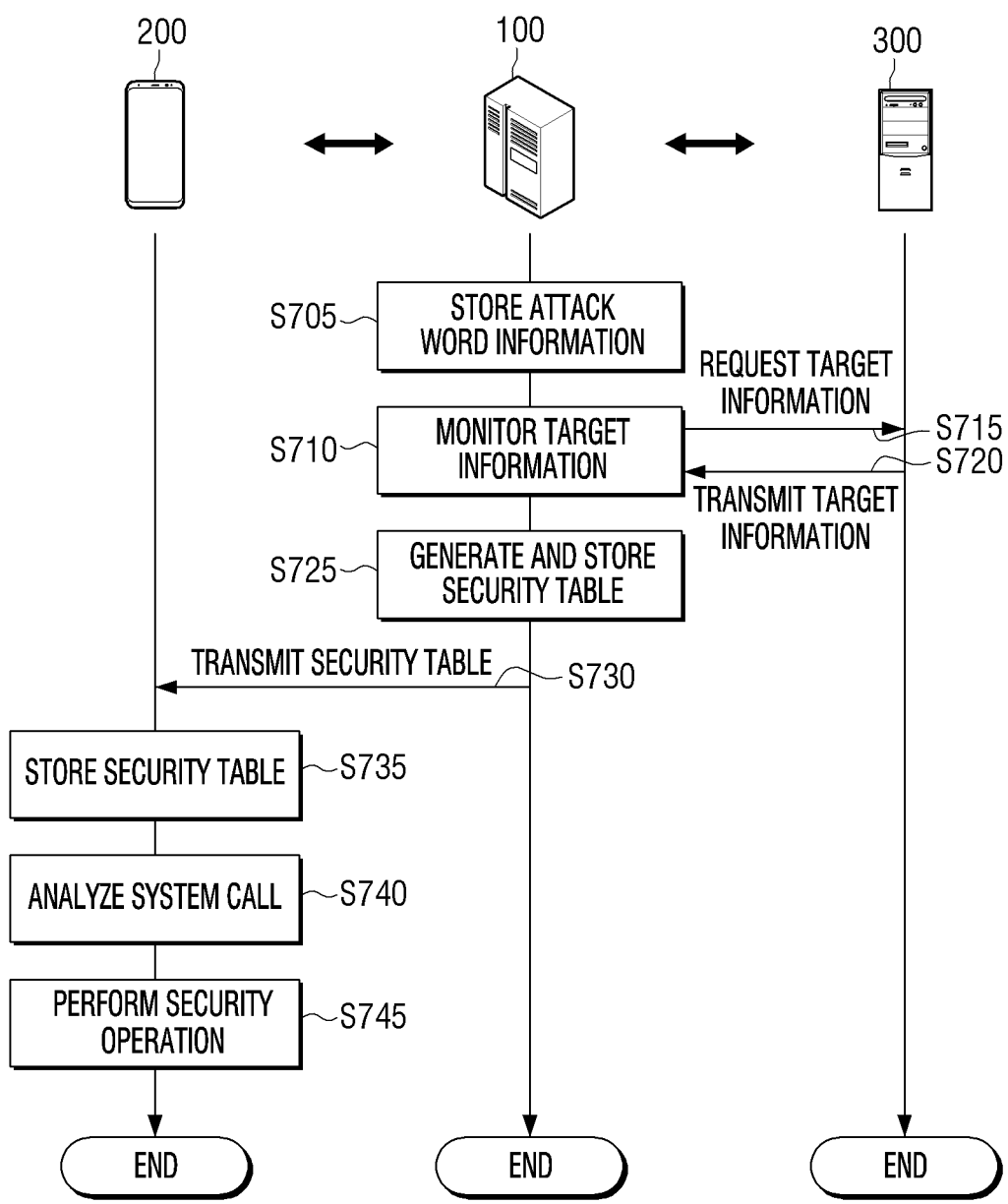
FIG. 7 is a signal flow diagram illustrating an example operation of a security system according to an embodiment.

FIG. 7 is a signal flow diagram illustrating an example operation of a security system according to an embodiment.

Referring to FIG. 7, the electronic apparatus 100 may store attack word information in the memory 110 in operation S705. The electronic apparatus 100 may monitor the target information based on a predetermined event in operation S710. The target information may refer to data for a target that is associated with security. The target information may refer to security-related data stored in an external server. For example, the target information may be web page information that includes security-related content included in the web system.

The electronic apparatus 100 may transmit a control signal requesting the target information to the server 300 through the communication interface 120 in operation S715. When the server receives the control signal requesting the target information from the electronic apparatus 100, the server may transmit the target information stored in the internal memory or the database to the electronic apparatus 100 in operation S720. The electronic apparatus 100 may perform monitoring based on the target information received from the server 300. A monitoring operation is described in greater detail below with reference to FIG. 8.

The electronic apparatus 100 may analyze the target information while monitoring target information and generate a security table based on the analysis result in operation S725. The electronic apparatus 100 may store the generated security table in the memory 110. The security table can be obtained by acquiring the primary information in the target information and changing the obtained main information to a predetermined format. The process of obtaining the main information will be described in greater detail below with reference to FIGS. 11 through 17 and the predetermined format will be described in greater detail below with reference to FIGS. 19 to 22.

The electronic apparatus 100 can transmit the security table stored in the memory 110 to the terminal device 200 based on a predetermined event in operation S730. The predetermined event may be either an event for receiving a signal requesting a security table by the terminal device 200 or an event for transmitting a security table to the terminal device 200 every periodic time. Referring to FIG. 7, the electronic apparatus 100 may transmit a security table to one of the terminal devices 200, but in actual implementation, the electronic apparatus 100 may transmit a security table to a plurality of terminal devices.

The terminal device 200 may receive a security table from the electronic apparatus 100 and store the received security table in the memory 210 of the terminal device 200 in operation S735. The terminal device 200 can perform system call analysis in operation S740. The system call analysis operation will be described in greater detail below with reference to FIG. 9. The terminal device 200 may perform a security operation based on the system call analysis result in operation S745.

Figure 8:
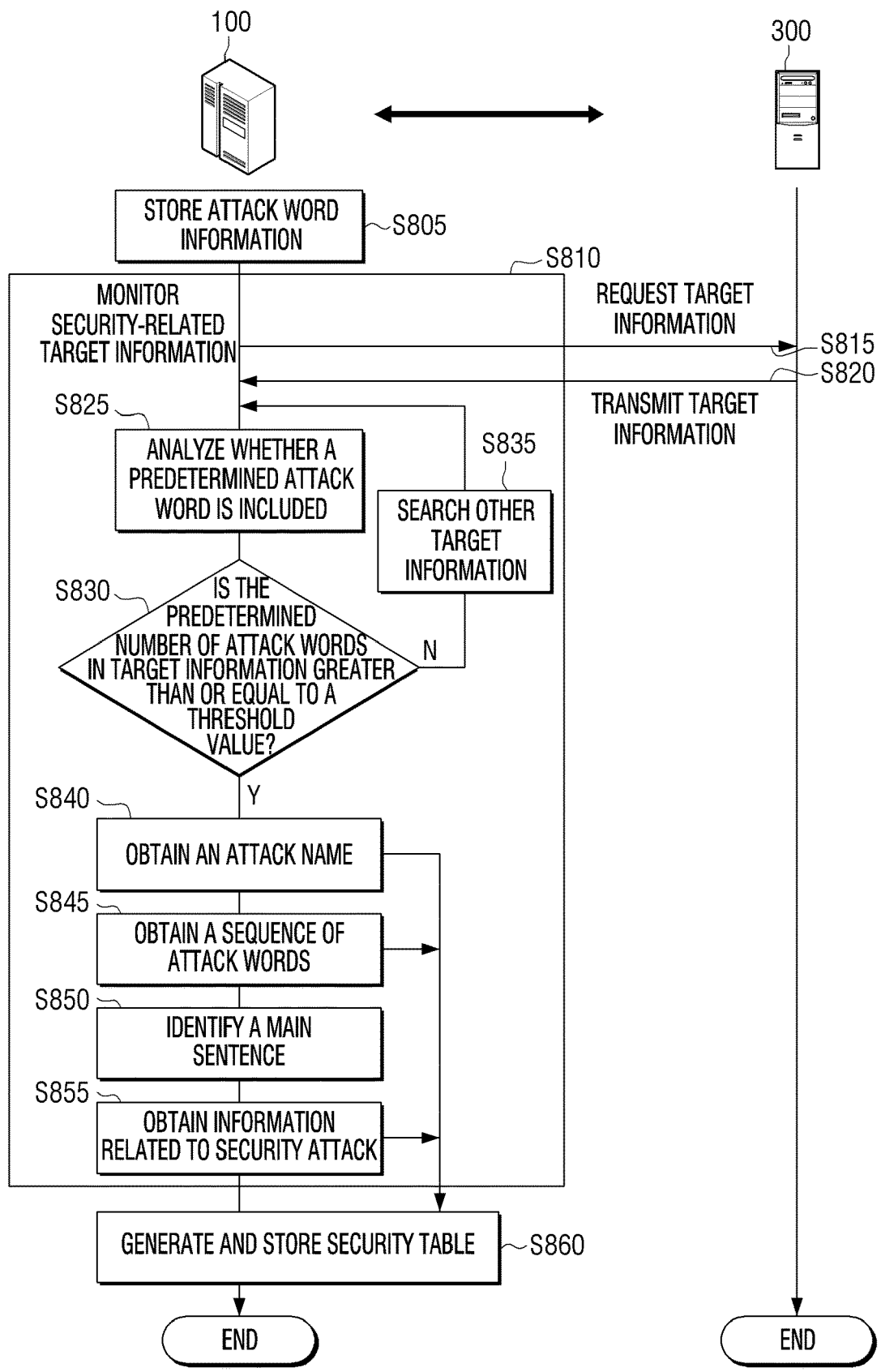
FIG. 8 is a signal flow diagram illustrating an example operation of a monitoring operation of FIG. 7 according to an embodiment.

FIG. 8 is a signal flow diagram illustrating an example operation of a monitoring operation of FIG. 7 according to an embodiment.

Referring to FIG. 8, the electronic apparatus 100 may store the attack word information in the memory 110 in operation S805. The electronic apparatus 100 can monitor target information based on the attack word information in operations S810. For example, the electronic apparatus 100 can request target information to the server 300 for monitoring operation in operation S815. The server 300 can transmit the target information stored in the database of the server 300 to the electronic apparatus 100 based on the request received from the electronic apparatus 100 in operation S820.

The electronic apparatus 100 can analyze target information received from the server 300. For example, the electronic apparatus 100 may analyze whether an attack word preset in the target information is included in operation S825. The electronic apparatus 100 may analyze the text included in the target information to identify whether the number of attack words predetermined in the target information is greater than or equal to a threshold value in operation S830. If the number of attack words obtained in the target information is below the threshold value ("N" in operation S830), the electronic apparatus 100 can search other target information in operation S835. The searching of other target information may refer to an operation of requesting new target information to the server 300 or analyzing new target information which is not yet analyzed among the already received plurality of target information. If the number of attack words obtained in the target information is greater than or equal to a threshold value ("Y" in operation S830), the electronic apparatus 100 may obtain information about an attack title (or an attack name) in the target information in operation S840. The electronic apparatus 100 can obtain the order information of the attack word (e.g., sequence of attack words) included in the target information in operation S845. The electronic apparatus 100 can identify a main sentence among the plurality of sentences included in the target information in operation S850. The electronic apparatus 100 can obtain security attack related information (or security attack additional information) in operation S855. According to an embodiment, the electronic apparatus 100 can generate and store a security table in S860 based on the attack name obtained in S840, the order of attack words obtained in S845, and the security attack related information obtained in S855. The electronic apparatus 100 can generate a security table based on the attack name obtained in S840, the order of the attack words obtained in S845, the information related to the security attack obtained in S855, and the main sentence identified in S850. In S840, S845, and S855 in FIG. 8, the right horizontal line may refer, for example, to the operation corresponding to the first embodiment, and the lines in the lower direction of the S840, S845, S850, and S855 may refer, for example, to the operation corresponding to the second embodiment.

If the number of attack words obtained in the target information is greater than or equal to a threshold value ("Y" in operation S830), the electronic apparatus 100 can generate a security table based on at least one of an attack name included in the target information, an order of an attack word, a main sentence, and a security attack related information in operation S860. The generated security table can be stored in the memory 110.

FIG. 9 is a signal flow diagram illustrating an example operation of a system call analysis of FIG. 7 according to an embodiment.

Referring to FIG. 9, based on the predetermined event, the electronic apparatus 100 can transmit the generated security table to the terminal device 200 in operation S905. The terminal device 200 can receive the security table from the electronic apparatus 100 and store the security table in the memory 210 in operation S910. The terminal device 200 can perform system call analysis in operation S915. For example, the terminal device 200 can compare the internally generated system call command with the security table stored in the memory 210 in operation S920. The terminal device 200 may identify whether the internally generated system call commands match with the system call pattern stored in the security table in operation S925. For example, assume a system call command internally generated is "A, B, C". The terminal device 200 may identify whether a system call pattern having the order of "A, B, C" is stored in a security table.

If the system call commands generated inside the terminal device 200 and the system call patterns stored in the security table are not matched with each other ("N" in operation S925), the newly generated system call commands can be continuously analyzed. If the system call commands generated in the terminal device 200 are matched with the system call pattern stored in the security table ("Y" in operation S925), the terminal device 200 can perform security operations corresponding to the matched system call pattern in operation S930. For example, the security operation may refer, for example, to an operation of stopping a system operation of the terminal device 200 to maintain security of the terminal device 200, blocking the network connection, an operation for informing the user of the warning notification, or the like. The security operation may have a predetermined method and is not limited to the above-described example.

In operation S915, the system call analysis operation can be performed by an artificial intelligence module. The artificial intelligence module may compare the similarity of the system call pattern with the security table stored in operation S910 and the system call command generated inside the terminal device 200. If the similarity of the comparison result is greater than or equal to the threshold value, the security operation corresponding to the identified system call pattern can be performed. The artificial intelligence module may receive the system call command generated inside the terminal device 200 as input data, and may calculate similarity between the received input data and the system call pattern of the security table stored in the memory. The artificial intelligence module can obtain similarity as output data.

FIG. 10 is a table illustrating example attack word information according to an embodiment.

Referring to FIG. 10, the electronic apparatus 100 can store information related to an attack word in the memory 100. The various information related to the attack word is described as the attack word information. The attack word may refer, for example, to an attack scheme associated with a security attack, and the attack word information may include, for example, and without limitation, an attack name, an attack technique, a synonym, a sub-word, a weight of a sub-word, and a system call pattern. The attack word information can be information stored by the user and may be updated periodically.

A table 1005 includes summary of attack word information. A synonym corresponding to the attack word may refer, for example, to a word that is recognized as the same word as the attack word. If the "Brute force" is an attack word, the synonym may be "Brute forcing". The electronic apparatus 100 can recognize "Brute force" and "Brute forcing" in the text information included in the target information as the same words. If the "Flooding" is an attack word, the synonym may be "Flood" or "SYN Flooding". If "Foot printing" is an attack word, the synonym may be "Foot printing scan" or "scanning". Also, when "Privilege Escalation" is an attack word, the synonym may be "Rooting", "elevate", and "elevating". The detailed operation associated with the synonym will be described in greater detail below with reference to FIG. 11.

A sub-word corresponding to the attack word may refer, for example, to a word which is mainly used along with an attack word, and can be a word pre-designated by a user. The electronic apparatus 100 can identify the main sentence among the plurality of sentences in which the attack word is included. The electronic apparatus 100 can identify whether a sub-word is included in the sentence in which the attack word is included. A human or artificial intelligence module can analyze whether an attack word includes an important content when used with which word. Based on the analysis result, a sub-word corresponding to the attack word can be determined. The sub-word can be in plural, and when there are a plurality of sub-words, a weight may be present in each sub-word. For example, if the "Brute force" is an attack word, the sub-word can be a launch (weight 0.7), attack (weight 0.2), and execute (weight 0.1). When the "Flooding" is an attack word, the sub-word can be a launch (weight 0.5), an attack (weight 0.4), and execute (weight 0.1). Different attack words may include the same sub-word. The same sub-word may be stored in a form with different weights according to the attack word. When "Foot printing" is an attack word, the sub-word may be being (weight 0.5) and execute (weight 0.5). When "Privilege Escalation" is an attack word, the sub-word can be exploit (weight 0.9) and execute (weight 0.1). The specific operation associated with the sub-word will be described in FIG. 16.

The system call pattern corresponding to the attack word may refer to a command order of a minimum unit in which the attack word is executed. For example, if "Brute force" is an attack word, the system call pattern that is the minimum unit command may be select->read->write->read->write->select->read->write->read->write-> . . . (omission). If "Flooding" is an attack word, the system call pattern may be poll->sendto->recvmsg->write->poll->sendto->recvmsg->write-> . . . (omission). When "Foot printing" is an attack word, the system call pattern may be connect->sendto->recvmsg->recvmsg->recvmsg-> . . . (omission). If "Privilege Escalation" is an attack word, the system call pattern may be Openat->getuid->getuid->read->getuid->geteuid->getpid-> . . . (omission). The electronic apparatus 100 may obtain a system call pattern corresponding to the attack word. A method of obtaining a system call pattern according to an embodiment may be analyzing the system call directly by a security expert or an administrator. The method for obtaining a system call pattern according to another embodiment may be that the electronic apparatus 100 directly analyzes security information stored (or posted) in an external server to obtain a system call pattern. The electronic apparatus 100 may store information on a system call pattern corresponding to an attack word in the memory 110 by the above methods.

FIG. 11 is a diagram illustrating an example analyzing operation whether a predetermined attack word is included in target information in a target information monitoring operation according to an embodiment.

FIG. 12 is a chart illustrating example synonyms of an attack word according to an embodiment.

FIG. 13 is a chart illustrating the number of an attack word according to an embodiment.

Referring to FIG. 11, the target information may be information received by an external server, such as a data server or a web system. Referring to FIG. 11, it is assumed that the target information is a webpage 1105 received from a web system. The web page 1105 may include text information including various words as described in FIG. 11. The electronic apparatus 100 can identify the number of attack words stored in the web page by analyzing the text information included in the web page 1105.

The prestored information about the attack word can be information corresponding to a table 1210 of FIG. 12. Each of the plurality of attack words may include synonyms. The information in the table 1210 of FIG. 12 can refer to a portion of the table 1005 described in FIG. 10. The electronic apparatus 100 can analyze the predetermined number of attack words in the web page 1105 by reference to the table 1210 of FIG. 12. The analyzed result may refer, for example, to information corresponding to a table 1310 of FIG. 13. In the web page 1105, there are four words of "Brute force" and there are four words of "Flooding". The electronic apparatus 100 can obtain a predetermined set attack word analysis result ("Brute force": 4, "Flooding": 4) included in the web page 1105 based on the table 1301. In addition, the electronic apparatus 100 can identify the number of attack words included in the web page 1105 by eight.

The electronic apparatus 100 can identify whether the web page 1105 includes security information based on the number of obtained attack words. An operation of identifying whether the security information is included may refer, for example, to identifying whether to determine as a target of obtaining information. When the electronic apparatus 100 determines to obtain security information included in the web page 1105, the electronic apparatus 100 may obtain security information for the web page 1105 to generate a security table.

According to an example embodiment, the electronic apparatus 100 can determine whether security information is obtained based on the total number of identified attack words. If the total number of attack words included in the target information is greater than or equal to a threshold value, the electronic apparatus 100 can determine to obtain security information in the target information. If the total number of attack words included in the target information is below a threshold value, the electronic apparatus 100 can analyze other target information. For example, assume that the threshold value associated with obtaining the security information is 8. Since the total number of attack words included in the web page is 8, the electronic apparatus 100 can identify the security information in the web page 1105.

According to another embodiment, the electronic apparatus 100 can determine whether the security information is obtained based on the identified number of each of the plurality of attack words. If at least one of the plurality of attack words is greater than or equal to a threshold value, the electronic apparatus 100 can determine to obtain security information in the target information. When the largest number among the number of the plurality of attack words included in the target information is less than a threshold value, the electronic apparatus 100 can analyze other target information. For example, assume that the threshold value is 4. The number of attack words identified in the web page 1105 can be "Brute force": 4 and "Flooding": 4. Since the largest number is 4 and is greater than or equal to a threshold value 4, the electronic apparatus 100 can identify that the security information is obtained in the web page 1105.

According to another embodiment, the electronic apparatus 100 can determine whether the security information is obtained based on the identified number of the plurality of attack words and the plurality of thresholds. For example, a first threshold value corresponding to the first attack word and a second threshold value corresponding to the second attack word may be different. The electronic apparatus 100 may determine whether the security information is obtained based on the first threshold, based on identifying the first attack word in the target information, and determine whether the security information is obtained based on the second threshold value based on the second attack word being identified in the target information.

FIG. 14 is a diagram illustrating an example of analyzing a predetermined attack word in the target information in a target information monitoring operation according to an embodiment.

Referring to FIG. 14, the electronic apparatus 100 may obtain the order information for the plurality of attack words in the target information determined to obtain the security information. In general, the description of the security attack may be posted in an order of operation. Accordingly, when posting information on a new security attack in target information (e.g., a web page), the content is expected to be posted based on the order of various attack techniques. Therefore, the electronic apparatus 100 can obtain the order of the attack words to obtain the order of the attack techniques in the target information.

A web page 1405 may be target information determined to obtain security information. The electronic apparatus 100 can obtain an attack word included in the web page 1405 in order. The electronic apparatus 100 can obtain information corresponding to a table 1410 listing the attack words identified in the web page 1405 in order. Here, the electronic apparatus 100 can remove a duplicate word. The electronic apparatus 100 can perform a control operation so that the duplicate word is deleted to leave only one of the attack words. The electronic apparatus 100 can obtain information corresponding to the table 1415 in which a duplicate attack word is removed and a plurality of attack words are identified in the identified order information.

FIG. 15 is a diagram illustrating another example of analyzing a predetermined order of an attack word in a target information monitoring operation according to an embodiment.

Referring to FIG. 15, the electronic apparatus 100 can obtain order information by collectively considering the order information of the plurality of attack words identified in the target information. Referring to FIG. 14, the order of different attack words is clearly distinguished, but the order of the web pages of FIG. 15 may not be clearly distinguished. To solve this problem, the electronic apparatus 100 can collectively consider the order information of the plurality of identified attack words.

The electronic apparatus 100 may obtain final order information based on the order value of the identified attack words. It is assumed that the target information is a webpage 1505. If the attack words identified in the webpage 1505 are arranged, information corresponding to a table 1510 may be obtained. The electronic apparatus 100 may obtain information corresponding to a table 1515 by deleting the duplicate attack words among the identified attack words.

The order for "Brute force" may be 1, 2, 5, 6, and the order for "Flooding" can be 3, 4, 7, 8. If each order is considered one value, the order value sum for the "Brute force" can be 1+2+5+6=14. The order value sum for "Flooding" can be 3+4+7+8=22. Here, the electronic apparatus 100 can identify that lower the sum of the order values, the higher the order. The electronic apparatus 100 can obtain the order information for the "Brute force" and "Flooding" identified in the web page 1505, and may identify that "Brute force" of which the sum of the order value is lower is performed earlier than "Flooding".

FIG. 16 is a diagram illustrating an example operation of identifying a main sentence in a target information monitoring operation according to an embodiment.

Referring to FIG. 16, the electronic apparatus 100 can obtain a main sentence. The electronic apparatus 100 can use at least one of an attack word stored in the memory 110 to obtain a main sentence, a sub-word corresponding to the attack word, or a weight of a sub-word corresponding to the attack word. Here, the sub-word may refer, for example, to a predetermined word and a word stored in the memory 110 of the electronic apparatus 100, and the weight of the sub-word may be different according to importance. A table 1610 can be a part of the table 1005 described in FIG. 10. The electronic apparatus 100 can store information corresponding to the table 1610 in the memory 110.

It is assumed that the target information is a web page 1605 and is determined to obtain security information in the web page 1605. The electronic apparatus 100 can identify a main sentence based on at least one of a sub-word or a weight of the sub-word of the identified attack word ("Brute force" and "Flooding") in the web page 1605. Since the "Brute force" is identified by four times in the web page 1605, the electronic apparatus 100 identify whether a sub-word associated with the "Brute force" is included in the four sentences. Since "Flooding" is identified by 4 times in the web page 1605, the electronic apparatus 100 can identify whether the sub-word related to "Flooding" is included in the four sentences.

Some attack words may have the same sub-words. The weight of the sub-word may be different for each attack word. For example, the weight of the sub-word "launch" with respect to "Brute force" may be 0.7, but the weight of the sub-word "launch" with respect to "Flooding" may be 0.5.

The electronic apparatus 100 can obtain information corresponding to the table 1615 based on at least one of a sub-word or a weight of a sub-word. The result value can be calculated as a value applying a weight value in the table 1615. The main sentence in the web page 1605 can be obtained by attack words. For example, if two different attack words are identified in the web page 1605, the electronic apparatus 100 can identify at least two main sentences. Since the different attack words are two in the web page, the electronic apparatus 100 can identify the main sentence corresponding to each attack word, and the main sentence corresponding to the "Brute force" as shown in the table 1615 may be identified as a first sentence 1606 based on a weight result 1616 of the table 1615, and the main sentence corresponding to "Flooding" can be identified as a 6th sentence 1607 based on the weight result 1617 of the table 1615.

FIG. 17 is a chart illustrating an example operation of obtaining security attack-related information in a target information monitoring operation according to an embodiment.

Referring to FIG. 17, the electronic apparatus 100 can obtain information related to the attack word (or additional information associated with the attack word) in the main sentence. The electronic apparatus 100 can analyze a remaining word except an attack name, an attack word, and a sub-word in the obtained main sentence. The electronic apparatus 100 may obtain a specific word according to a predetermined criterion in the main sentence. The electronic apparatus 100 can identify a word class of a main sentence and identify a word corresponding to a noun as additional information associated with the attack word. The additional information associated with the attack word may be information about the target, which is to be an attacked corresponding to the attack word.

For example, the main sentence for "Brute force" in the web page 1605 described in FIG. 16 may be "Then Mirai launcher brute-force attack on the Telnet port to infect the devices." In the main sentence, "Mirai" may be an attack name, and "launches" and "attack" may be sub-words (according to an embodiment, if the sub-word is identified as being more than two), the "attack" can be excluded from the sub-word as the word class is not a verb, and the "brute-force" can be an attack word. Here, words except an attack name, an attack word, and a sub-word may be "Then", "on the", "to do," "the devices", and "Telnet port". The electronic apparatus 100 may identify the word class of a word and may exclude a conjunction, a relative adverb, an adjective, a pronoun, or the like. Here, if the left words are greater than or equal to the plural number, the electronic apparatus 100 can identify a word corresponding to the noun. Finally, the electronic apparatus 100 can obtain "Telnet port" in the main sentence corresponding to the "Brute force". The electronic apparatus 100 can store "Telnet port" as additional information of a "Brute force."

The main sentence of "Flooding" may be "Finally, the Bashlite variant is "Ayedz", which is capable of delivering DDoS blows, run backdoor commands, can launch flood attacks against a wide range of router models." By the above method, if an attack word, a sub-word, and a predetermined word class are removed, it may be "Bashlite", "Ayedz", "DDoS", "backdoor commands" or "router models". The electronic apparatus 100 can store at least one of the plurality of obtained words as additional information of the attack word. Here, the electronic apparatus 100 can identify a word that can be a target of an attack among a plurality of words, and the electronic apparatus 100 can obtain only "router models" as additional information of the attack word.

The electronic apparatus 100 may store information corresponding to a table 1705 in the memory 110 based on a main sentence.

FIG. 18 is a chart illustrating an example operation of identifying overlapping target information in a target information monitoring operation according to an embodiment.

Referring to FIG. 18, the electronic apparatus 100 can request the target information to the server 300 at a predetermined cycle. The server 300 can transmit target information to the electronic apparatus 100. The predetermined cycle can be changed by a user's setting. It may be difficult for the electronic apparatus 100 to analyze all target information of the server 300 at a predetermined cycle. Therefore, the electronic apparatus 100 can require an operation to distinguish target information of which analysis has been completed.

When the electronic apparatus 100 receives target information from the server 300, the information about the target information can be summarized and stored in the memory 110. For example, the electronic apparatus 100 can store, in the memory 110, at least one of a source of target information (e.g., website address, website name), address information of target information (e.g., web page address), time information, security relevance, document title, document content, or the like. Referring to a table 1805, the electronic apparatus 100 can store the first target information received from the server 300 into a site: A, address: #A01, date: 2019 Sep. 1, security relevance: O, title: "DDOS coming", content: "a1, a2, a3". The process of storage of the second to fourth target information is similar to the first target information, and thus the description thereof will be omitted.

According to an example embodiment, the electronic apparatus 100 can request only new target information to the server 300. Target information not stored in the memory 110 can be requested to the server 300, and the server 300 can transmit the requested target information to the electronic apparatus 100. The electronic apparatus 100 can request only new target information to the server 300 based on at least one of address information or time information of target information stored in the memory 110. As one example, if the address information stored in the memory 110 is #A01 and #A02, the electronic apparatus 100 can request target information corresponding to #A03 to the server 300. As another example, if the recent posting date of the target information stored in the memory 110 is 2019-010-02-02, the electronic apparatus 100 can request target information after the date of 2019 Sep. 3 to the server 300.

According to another embodiment, based on receiving target information from the server 300, the electronic apparatus 100 can identify whether the target information is matched with the target information stored in the memory 110. The table 1805 may represent a format for storing target information. Based on receiving fifth target information from the serer 300, the electronic apparatus 100 can identify whether the target information is the same as the first to fourth target information stored in the memory 110. If the fifth target information is the same as the first to fourth target information stored in the memory 110, the electronic apparatus 100 can determine that the security information is not obtained for the fifth target information and may request other target information to the server 300. If the number of consecutive times that the target information received from the server 300 is already stored in the memory 110 is greater than or equal to a threshold value, the electronic apparatus 100 may no more request the target information to the server 300.

The operation of identifying the overlapping target information described in FIG. 18 can be performed using an artificial intelligence module. The artificial intelligence module can be a module trained with learning data according to the method described in FIG. 18. The artificial intelligence module may receive target information as input data and obtain the non-overlapping target information as output data based on the received input data.

FIG. 19 is a chart illustrating an example operation of generating and storing a security table according to an embodiment.

Referring to FIG. 19, the electronic apparatus 100 can generate a security table based on the security information obtained from the target information. The security table can be a predetermined format for security information. That is, the electronic apparatus 100 can store the security information of the target information based on the predetermined format. The electronic apparatus 100 can store at least one of an attack name, an attack type, an attack word, an execution order of an attack word, a system call pattern, additional information of an attack word (or security related information of an attack word) in the memory 110. For example, the electronic apparatus 100 can obtain security information from the target information (webpage 1105) of FIG. 11 received from the server 300. The electronic apparatus 100 can obtain an attack name (Mirai), an attack type (DDOS), an attack word ("Brute force", "Flooding"), or the like, from the target information. The electronic apparatus 100 may obtain the sequence information 1, system call pattern (select->read->write->read->write->select->read->write->read->write->(omission)), and additional information (Telnet port) with respect to "Brute force," and may obtain the sequence information 2, system call pattern (poll->sendto->recvmsg->write->poll->sendto->recvmsg->write->(omission)), and additional information (router models), with respect to "Flooding."

The system call pattern illustrated in FIG. 19 can be obtained in the memory 110 other than the target information. For example, based on identifying a "Brute force" in the target information, the electronic apparatus 100 can identify a system call pattern corresponding to the "Brute force" in the memory 110 and store a system call pattern corresponding to the identified "Brute force" in the memory 110 in a format corresponding to the table 1905.

FIG. 20 is a chart illustrating an example format in an example operation of generating and storing a security table according to an embodiment.

Referring to FIG. 20, the electronic apparatus 100 can store a system call pattern for each operating system. The system call pattern can be varied to perform an attack word, and the system call pattern may be the same or different according to the operating systems. As to "Brute force", the system call pattern may be the same as "select→read→write→(omission)" for the first operating system, the second operating system, and the third operating system. As to "Flooding," the system call pattern of the first operating system may be "poll→sendto→recvmsg→write→(omission)", and the system call pattern in the second operating system may be "poll→sendto→recvmsg→(omission)", and the system call pattern in the third operating system may be "sendto→(omission)."

The electronic apparatus 100 can store a system call pattern for each operating system corresponding to one attack word, and can generate a security table of target information received from the server 300 based on a system call pattern for each stored operating system. The electronic apparatus 100 can store information corresponding to the security table of the format corresponding to the table 2005 in the memory 110.

FIG. 21 is a diagram illustrating an example format according to an example operation of generating and storing a security table according to an embodiment.

Referring to FIG. 21, the electronic apparatus 100 may store a system call pattern that is commonly recognized regardless of an operating system. For example, if there are different system call patterns according to operating systems, the electronic apparatus 100 may obtain the common system call pattern by analyzing the common system call command and store the same (the obtained common system call pattern) in the memory 110.

In the case of "Brute force", the system call pattern can be the same for each operating system. The electronic apparatus 100 may store the system call pattern as being "select→read-→write→(omission)". In the case of "Flooding", the system call pattern can be different for each operating system, as shown in FIG. 20. In the example of "Flooding," the electronic apparatus 100 may identify a common system call command and store the command as a representative system call pattern of "Flooding". For example, in the case of "Flooding," the electronic apparatus 100 may store the system call pattern of "Flooding" as "sendto→(omission)."

The electronic apparatus 100 may store a common system call pattern corresponding to the attack word in the memory 110 in a format corresponding to the table 2105. The electronic apparatus 100 may generate a security table using a common system call pattern and transmit the generated security table to the terminal device 200. In that the operating system of the terminal device 200 may be different, if using a security table generated with a common system call pattern, the electronic apparatus 100 can reduce the data size of the security table and increase the transmission efficiency for the security table.

FIG. 22 includes charts illustrating an example format in an example operation of generating and storing a security table according to an embodiment.

Referring to FIG. 22, the electronic apparatus 100 may translate (transpose) and store system call commands for each operating system. The table 2205 is a system call translation table (or system call transposition table) representing a representative name and a representative number with respect to system call commands for each operating system. The information included in the table 2205 described herein is translation information. The representative name may be a pre-defined translation word and the representative number may be a predefined translation number. For example, the a1 system call command in the first operating system may be used as a2 in the second operating system and a3 in the third operating system. Though the commands are same, the commands may be used as different commands depending on operating systems. Here, the electronic apparatus 100 can translate (transpose) a1, a2, a3 into a pre-defined translation word or a pre-defined translation number (#0001) and store same. In the same manner, the b1 system call command of the first operating system, the b2 system call command of the second operating system, and the b3 system call command of the third operating system may be translated (transposed) to a pre-defined translation word or pre-defined translation number (#0002).

The electronic apparatus 100 may store translation information (information corresponding to the table 2205) in the memory 110. The electronic apparatus 100 can translate a system call pattern corresponding to an attack word based on the translation information. In the specification, in order to distinguish a system call pattern before translation and a system call pattern after translation, a system call pattern after translation is described as a security pattern. Accordingly, the electronic apparatus 100 can translate the system call pattern corresponding to the attack word into a security pattern including a predefined translation word based on the translation information.

For the first attack word, the system call pattern in the first operating system is assumed to be "a1-b1-c1". The electronic apparatus 100 can translate and store the system call patterns "a1-b1-c1". The electronic apparatus 100 may store the system call pattern "a1-b1-c1" of the first attack word as the security pattern "A-B-C" based on the table 2205.

For the second attack word, the system call pattern in the second operating system is assumed to be "d2-e2-f2". The electronic apparatus 100 can translate and store the system call pattern "d2-e2-f2". The electronic apparatus 100 may store the system call pattern "d2-e2-f2" of the second attack word as the security pattern "D-E-F" based on the table 2205.

The electronic apparatus 100 may store the representative terminal device 200 corresponding to the attack word in the memory 110 in a format corresponding to the table 2210 in the target information. The electronic apparatus 100 may generate a security table using the sequence information and the security pattern for the attack word, and transmit information (security information) corresponding to the generated security table and information (translation information) corresponding to the system call translation table (or system call transposition table) to the terminal device 200.

The terminal device 200 can identify a security threat based on the received security information and the translation information. For example, the terminal device 200 can identify a security threat based on the internally generated system call pattern, the security information received from the electronic apparatus 100, and the translation information.

According to an example embodiment, the terminal device 200 can translate the received security pattern based on the translation information into a system call pattern corresponding to the operating system of the terminal device 200. For example, the terminal device 200 may receive the security pattern "A-B-C" and the operating system of the terminal device 200 may be the first operating system. The terminal device 200 may translate the received security pattern "A-B-C" into an "a1-b1-c1" system call pattern corresponding to the first operating system. The terminal apparatus 200 can identify a security threat by comparing the internally generated system call command and the "a1-b1-c1" system call pattern.

According to another embodiment, the terminal device 200 may change a system call command that occurs internally of the system of the terminal device 200 to a pre-defined translation word based on the translation information and the operating system of the terminal device 200. For example, the terminal device 200 may receive the security pattern "A-B-C" and the operating system of the terminal device 200 is the first operating system. The terminal device 200 can translate the internally generated system call command into a pre-defined translation word based on the translation information, and compare the order of the translated system call command with the received security pattern "A-B-C" to identify a security threat.

In a method of identifying a security threat using translation information, a security table may be generated without considering an operating system of the terminal device 200 and thus, efficient storage is possible in data processing.

Figure 23:
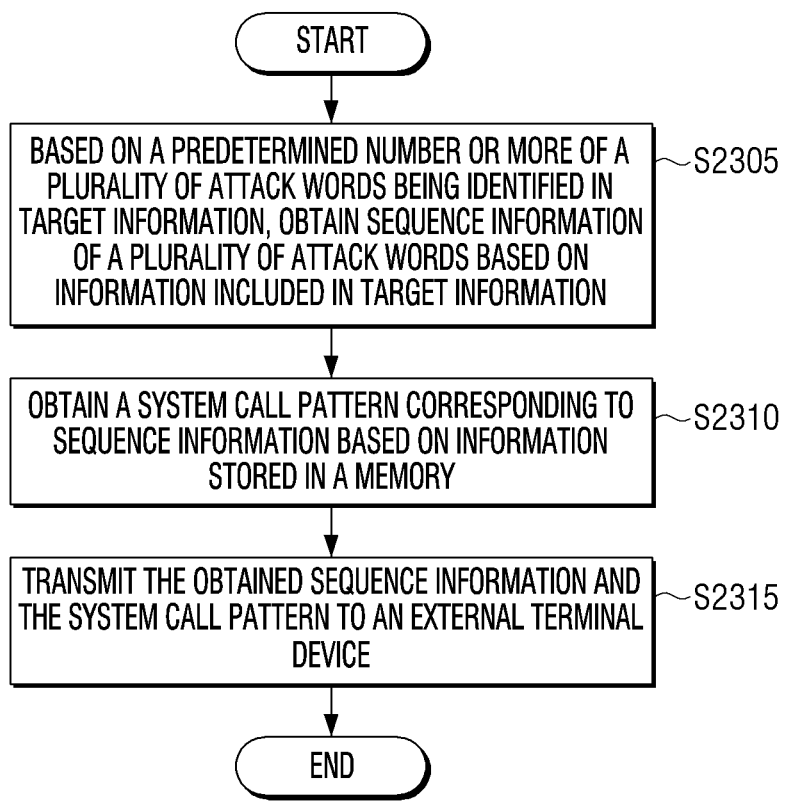
FIG. 23 is a flowchart illustrating an example method of controlling an electronic apparatus according to an embodiment.

FIG. 23 is a flowchart illustrating an example method of controlling an electronic apparatus according to an embodiment.

A method of controlling the electronic apparatus 100 for storing information including a plurality of attack words and a system call pattern corresponding to each of the plurality of attack words may include, based on a predetermined number or more of each of a plurality of attack words stored in the electronic apparatus 100 being identified in target information, obtaining sequence information of a plurality of attack words based on target information in operation S2305.

The system call pattern corresponding to the sequence information can be obtained based on the information stored in the memory 110 of the electronic apparatus 100 in operation S2310. The information stored in the memory 110 may refer to the attack word information described above.

The obtained sequence information and the system call pattern may be transmitted to the external terminal device 200 in operation S2315.

The operation S2305 of obtaining the sequence information may include receiving the target information from the server 300, obtaining text information from the received target information, searching each of the plurality of attack words in the obtained text information to identify each of the plurality of attack words, and obtaining sequence information based on an order in which each of the attack words is searched in the obtained text information.

The electronic apparatus 100 (or the terminal device 200) may store a sub-word associated with each of the plurality of attack words, and the controlling method may further include identifying a sentence, among a plurality of sentences included in target information, including an attack word and a sub-word associated with the attack as a main sentence and obtaining additional information associated with the attack word in the main sentence, and the transmitting operation may include transmitting the obtained additional information along with the obtained sequence information and the system call pattern to the external terminal device 200.

The electronic apparatus 100 may store a plurality of sub-words associated with at least one attack word among a plurality of attack words and weight information corresponding to each of the plurality of sub-words, and the operation of identifying as a main sentence may include, based on identifying an attack word and a first sub-word associated with the attack word from a first sentence and identifying an attack word and a second sub-word associated with the attack word from a second sentence, among a plurality of sentences included in target information, identifying a sentence including a sub-word having a highest weight, between first and second sub-words, as a main sentence based on weight information.

The operation of identifying the main sentence can include, based on identifying a sentence, among a plurality of sentences included in target information, identifying a word class of a sub-word and based on an identified word class of the sub-word being a verb, identifying the identified sentence as a main sentence.

Additional information may include at least one of an Internet protocol (IP) address, universal resource locator (URL) information, or attack target information associated with an attack word.

A system call pattern may include sequence information for commands in a minimum unit to perform an operation corresponding to an attack word in a system.

The method may further include generating a security pattern by changing a system call command included in a system call pattern corresponding to each of a plurality of attack words to a predefined translation word based on the translation information, and transmitting the translation information and the generated security pattern to the external terminal device 200. The translation information may include a plurality of predefined translation words corresponding to system call commands of each of the plurality of operating systems, wherein a first translation word among the plurality of predefined translation words may correspond to a first system call command of the first operating system and a second system call command of the second operating system, and the first operating system may be different from the second operating system.

The method of controlling the electronic apparatus 100 as illustrated in FIG. 23 may be executed on an electronic apparatus including the configuration of FIG. 2, and may be executed on an electronic apparatus including the other configurations.

Figure 24:
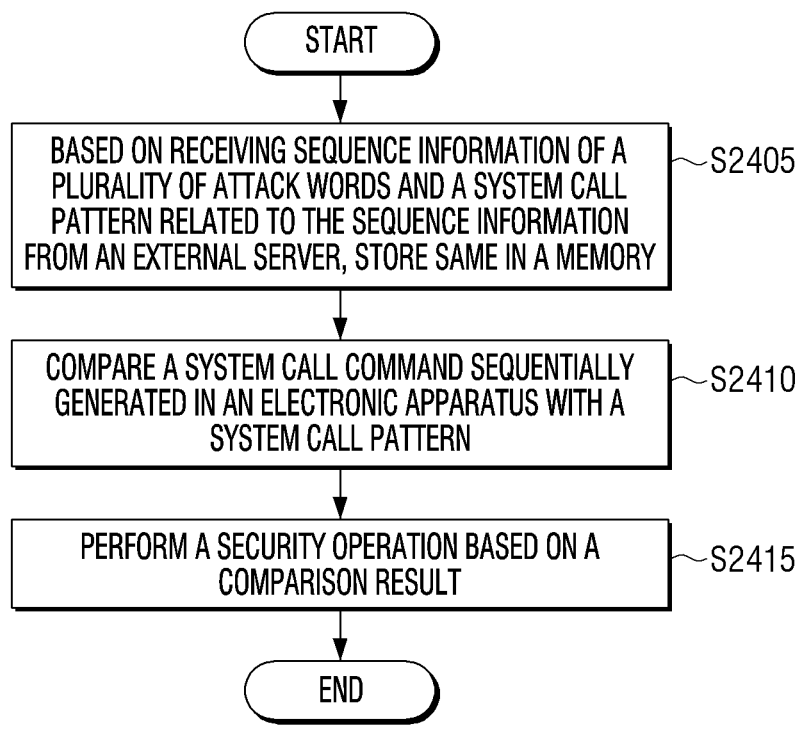
FIG. 24 is a flowchart illustrating an example method of controlling a terminal device according to an embodiment.

FIG. 24 is a flowchart illustrating an example method of controlling a terminal device according to an embodiment.

According to an embodiment, the method of controlling an electronic apparatus (terminal device 200) may include, based on receiving, from an external server (electronic apparatus 100), sequence information of a plurality of attack words and a system call pattern related to sequence information, storing, in the memory 210, sequence information of the plurality of received attack words and a system call pattern associated with the sequence information in operation S2405.

A system call command sequentially generated in the electronic apparatus (terminal device 200) may be compared with a stored system call pattern in operation S2410.

A security operation can be performed based on a comparison result in operation S2415.

Sequence information may refer to order information of a plurality of attack words associated with a security attack.

Sequence information of a plurality of attack words and a system call pattern related to sequence information can be generated at an external server, based on each of a plurality of attack words being identified by more than a predetermined number in the target information.

In performing a security operation in S2415, after the system call pattern corresponding to one of the plurality of attack words is executed, based on identifying that at least some system call included in the system call pattern corresponding to the next attack word according to the sequence information is generated, the security operation can be performed.

The system call pattern associated with the sequence information may include a plurality of words and order information among the plurality of words.

The operation S2415 may include, based on identifying that a security attack corresponding to the sequence information is in progress, performing a security operation corresponding to the identified security attack.

The comparing in operation S2410 may include, after the system call pattern corresponding to one of the plurality of attack words is executed, based on identifying that at least some system call commands included in the system call pattern corresponding to the next attack word according to the sequence information are generated at the terminal device, identifying that the security attack corresponding to the sequence information is in progress, and performing the security operation corresponding to the identified security attack.

The sequence information may include a first attack word and a second attack word, and the system call pattern associated with the sequence information may include a first system call pattern corresponding to the first attack word and a second system call pattern corresponding to the second attack word, wherein each of the first system call pattern and the second system call pattern may include a plurality of system call commands, and the comparing operation S2410 may include, after the plurality of system call commands included in the first system call pattern are executed, based on identifying that some of the plurality of system call commands included in the second system call pattern are executed at the terminal device, identifying that the security attack corresponding to the sequence information is in progress.

A system call pattern received from an external server (electronic apparatus 100) can be a security pattern that is changed into a predefined translation word based on the translation information. The controlling method can receive the translation information and the security pattern from an external server (electronic apparatus 100). The method can translate the security pattern to a system call pattern corresponding to the operating system of the electronic apparatus (terminal device 200) based on the received translation information and the operating system of the electronic apparatus (terminal device 200). The controlling method can compare the system call commands sequentially generated in the electronic apparatus (terminal device 200) to the stored sequence information and the translated system call pattern. The translation information may include a plurality of pre-defined translation words corresponding to a system call command of each of the plurality of operating systems, wherein a first translation word among the plurality of predefined translation words may correspond to a first system call command of the first operating system and a second system call command of the second operating system, and the first operating system can be different from the second operating system.

The system call pattern may include order information with respect to commands in a minimum unit to perform an operation corresponding to an attack word in an electronic apparatus (terminal device 200).

The method of controlling the terminal device 200 as illustrated in FIG. 24 may be executed in an electronic apparatus having a configuration of FIGS. 3 and 4, or may be executed in an electronic apparatus having other configurations.

The methods according to the various embodiments as described above may be implemented as an application format installable in an existing electronic apparatus.

The methods according to the various embodiments as described above may be implemented as software upgrade or hardware upgrade for an existing electronic apparatus.

The various embodiments described above may be performed through an embedded server provided in an electronic apparatus, or an external server of at least one electronic apparatus and a display device.

Meanwhile, various embodiments may be implemented in software, including commands stored on machine-readable storage media readable by a machine (e.g., a computer). An apparatus may call commands from the storage medium, and execute the called command, including an electronic apparatus (for example, electronic apparatus A) according to the disclosed embodiments. When the commands are executed by a processor (e.g., at least one processor), the processor may perform a function corresponding to the commands directly or using other components under the control of the processor. The commands may include a code made by a compiler or a code executable by an interpreter. A machine-readable storage medium may be provided in the form of a non-transitory storage medium. Herein, the "non-transitory" storage medium is tangible, and does not distinguish the case in which a data is semi-permanently stored in a storage medium from the case in which a data is temporarily stored in a storage medium.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various embodiments, the respective elements (e.g., module or program) mentioned above may include a single entity or a plurality of entities. According to embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been illustrated and described with reference various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. A terminal device comprising:
a communication interface comprising communication circuitry;
a memory configured to store at least one command; and
a processor, connected to the communication interface and the memory, configured to control the terminal device,
wherein the processor, by executing the at least one command, is further configured to:
based on receiving, from an external server, sequence information of a plurality of attack words and a system call pattern associated with the sequence information, store the received sequence information and the received system call pattern in the memory, compare a system call command sequentially generated in the terminal device with the stored sequence information and the stored system call pattern, perform a security operation based on the comparison, wherein the sequence information of the plurality of attack words and the system call pattern associated with the sequence information are generated by the external server based on an occurrence of each of the plurality of attack words being identified from target information by a predetermined number or more.

2. The terminal device of claim 1, wherein the sequence information includes order information of a plurality of attack words associated with security attack, and wherein the processor is further configured to:

based on identifying that a security attack corresponding to the sequence information is in progress based on the comparison, perform a security operation corresponding to the identified security attack.

3. The terminal device of claim 1, wherein the processor is further configured to: based on a system call pattern corresponding to one of the plurality of attack words being executed, based on identifying that at least some system call commands included in a system call pattern corresponding to a next attack word according to the sequence information are generated in the terminal device, identify that a security attack corresponding to the sequence information is in progress and perform a security operation corresponding to the identified security attack.

4. The terminal device of claim 3, wherein the sequence information comprises a first attack word and a second attack word, a system call pattern associated with the sequence information comprises a first system call pattern corresponding to the first attack word and a second system call pattern corresponding to the second attack word, each of the first system call pattern and the second system call pattern comprising a plurality of system call commands, and wherein the processor is further configured to: based on a plurality of system call commands included in the first system call pattern being executed, based on identifying that some system call commands among a plurality of system call commands included in the second system call pattern are executed in the terminal device, identify that a security attack corresponding to the sequence information is in progress.

5. The terminal device of claim 1, wherein the processor is further configured to: based on receiving a plurality of sequence information and a system call pattern associated with the plurality of sequence information from the external server, store the received plurality of sequence information and the received system call pattern associated with the plurality of sequence information in the memory, and wherein the processor is further configured to:

identify at least one sequence information among the plurality of sequence information based on a system call command sequentially generated in the terminal device, compare the at least one identified sequence information and the stored system call pattern, perform a security operation based on a comparison, and wherein security attacks corresponding to the plurality of sequence information are different from each other.

6. The terminal device of claim 5, wherein the processor is further configured to:

based on identifying that a first security attack corresponding to first sequence information among the plurality of sequence information is in progress, perform a first security operation, and based on identifying that a second security attack corresponding to second sequence information among the plurality of sequence information is in progress, perform a second security operation, and wherein the first security operation is different from the second security operation.

7. The terminal device of claim 1, wherein the system call pattern received from the external server includes a security pattern changed to a predefined translation word based on translation information, and wherein the processor is further configured to:

receive the translation information and the security pattern from the external server, translate the security pattern to a system call pattern corresponding to an operating system of the terminal device based on the received translation information and the operating system of the terminal device, compare a system call command sequentially generated in the terminal device with the stored sequence information and the translated system call pattern, and wherein the translation information includes information to translate the system call command corresponding to each of the plurality of operating systems to the predefined translation word.

8. The terminal device of claim 1, wherein the system call pattern comprises order information with respect to a minimum unit of commands to perform an operation corresponding to the attack word in the terminal device.

9. An electronic apparatus comprising:

a communication interface comprising communication circuitry;

a memory configured to store at least one command; and a processor, connected to the communication interface and the memory, configured to control the electronic apparatus, wherein the memory is further configured to store information including a plurality of attack words and a system call pattern corresponding to each of the plurality of attack words, wherein the processor, by executing the at least one command, is further configured to:

based on each of the plurality of attack words stored in the memory occurring by a predetermined number or more being identified from target information, obtain sequence information of the plurality of attack words based on the target information, obtain a system call pattern corresponding to the sequence information based on the information stored in the memory, and control the communication interface to transmit, to an external terminal device, the obtained sequence information and the system call pattern, wherein the sequence information and the system call pattern are compared with a system call command sequentially generated in the external terminal device.

10. The electronic apparatus of claim 9, wherein the processor is further configured to:

receive the target information from an external server, obtain text information from the received target information, identify each of the plurality of attack words by searching each of the plurality of attack words from the obtained text information, and obtain the sequence information based on an order of searching each of the attack words from the obtained text information.

11. The electronic apparatus of claim 9, wherein the memory is further configured to store a sub-word associated with each of the plurality of attack words, and wherein the processor is further configured to: identify a sentence, among a plurality of sentences included in the target information, including an attack word and a sub-word associated with the attack word as a main sentence, obtain additional information associated with the attack word from the main sentence, and control the communication interface to transmit, to the external terminal device, the obtained additional information, together with the obtained sequence information and the system call pattern.

12. The electronic apparatus of claim 11, wherein the memory is further configured to store a plurality of sub-words associated with at least one attack word among the plurality of attack words and information about weights respectively corresponding to each of the plurality of sub-words, and wherein the processor is further configured to: based on the attack word and a first sub-word associated with the attack word being identified from a first sentence among a plurality of sentences included in the target information and based on the attack word and a second sub-word associated with the attack word being identified from a second sentence among a plurality of sentences included in the target information, identify a sentence including a sub-word having a relatively high weight among the first and second sub-words as a main sentence based on the weight information.

13. The electronic apparatus of claim 11, wherein the processor is configured to: based on a sentence including an attack word and a sub-word associated with the attack word being identified among a plurality of sentences included in the target information, identify a word class of the sub-word and based on the word class of the identified sub-word being a verb, identify the identified sentence as a main sentence.

14. The electronic apparatus of claim 11, wherein the additional information comprises at least one of an Internet protocol (IP) address, universal resource locator (URL) information or attack target information associated with the attack word.

15. The electronic apparatus of claim 9, wherein the system call pattern comprises order information about commands in a minimum unit to perform an operation corresponding to the attack word in a system.

16. The electronic apparatus of claim 9, wherein the processor is further configured to:

generate a security pattern by changing a system call command included in a system call pattern corresponding to each of the plurality of attack words to a predefined translation word based on translation information, and control the communication interface to transmit the translation information and the generated security pattern to the external terminal device, wherein the translation information includes information to translate the system call command corresponding to each of a plurality of operating systems into the predefined translation word.

17. A method of controlling a terminal device, the method comprising:

receiving, from an external server, sequence information of a plurality of attack words and a system call pattern associated with the sequence information and storing the received sequence information and the received system call pattern in a memory;

comparing a system call command sequentially generated in the terminal device with the stored sequence information and the stored system call pattern; and performing a security operation based on the comparing, wherein the sequence information of the plurality of attack words and the system call pattern associated with the sequence information are generated by the external server, based on an occurrence of each of the plurality of attack words being identified from target information by a predetermined number or more.

18. The method of claim 17, wherein the sequence information includes order information of a plurality of attack words associated with security attack, wherein the performing the security operation comprises, based on identifying that a security attack corresponding to the sequence information is in progress based on the comparing, performing a security operation corresponding to the identified security attack.

19. The method of claim 17, wherein the comparing comprises, based on a system call pattern corresponding to one of the plurality of attack words being executed, based on identifying that at least some system call commands included in a system call pattern corresponding to a next attack word according to the sequence information being generated in the terminal device, identifying that a security attack corresponding to the sequence information is in progress and performing a security operation corresponding to the identified security attack.

20. The method of claim 19, wherein the sequence information comprises a first attack word and a second attack word, a system call pattern associated with the sequence information comprises a first system call pattern corresponding to the first attack word and a second system call pattern corresponding to the second attack word, each of the first system call pattern and the second system call pattern comprises a plurality of system call commands, wherein the comparing comprises, based on a plurality of system call commands included in the first system call pattern being executed, based on identifying that some system call commands among a plurality of system call commands included in the second system call pattern are executed in the terminal device, identifying that a security attack corresponding to the sequence information is in progress.

* * * * *